(12) United States Patent
Ichihara et al.

(10) Patent No.: US 8,277,133 B2
(45) Date of Patent: *Oct. 2, 2012

(54) FOCAL PLANE SHUTTER FOR CAMERAS

(75) Inventors: Masakatsu Ichihara, Tokyo (JP);
Nobuyoshi Inoue, Tokyo (JP)

(73) Assignee: Nidec Copal Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/758,439

(22) Filed: Apr. 12, 2010

(65) Prior Publication Data

US 2010/0284685 A1 Nov. 11, 2010

Related U.S. Application Data

(62) Division of application No. 11/729,983, filed on Mar. 30, 2007, now Pat. No. 7,775,728.

(30) Foreign Application Priority Data

Mar. 31, 2006 (JP) ................................. 2006-098801
Mar. 20, 2007 (JP) ................................. 2007-073387

(51) Int. Cl.
*G03B 9/08* (2006.01)

(52) U.S. Cl. .................... 396/456; 396/466; 396/470

(58) Field of Classification Search .................. 396/444, 396/456, 466, 470, 471, 495, 357, 469
See application file for complete search history.

(56) References Cited

U.S. PATENT DOCUMENTS

| | | | | |
|---|---|---|---|---|
| 4,668,145 A | * | 5/1987 | Hirohata | 411/508 |
| 5,011,246 A | * | 4/1991 | Corradetti et al. | 385/92 |
| 5,239,325 A | * | 8/1993 | Fukuda | 396/465 |
| 5,632,581 A | * | 5/1997 | Hasada | 411/48 |
| 5,813,300 A | * | 9/1998 | Bittner | 82/150 |
| 6,749,348 B2 | * | 6/2004 | Seita | 396/443 |
| 6,850,281 B2 | * | 2/2005 | Takahashi | 348/363 |
| 6,899,472 B2 | * | 5/2005 | Takahashi et al. | 396/463 |
| 2001/0010560 A1 | * | 8/2001 | Takahashi | 348/367 |
| 2003/0002877 A1 | * | 1/2003 | Kudo et al. | 396/489 |
| 2003/0228145 A1 | * | 12/2003 | Ito et al. | 396/484 |

FOREIGN PATENT DOCUMENTS

| | | |
|---|---|---|
| JP | 56-53310 | 5/1981 |
| JP | 4-3301 | 1/1992 |
| JP | 6-24825 | 2/1994 |
| JP | 7-3392 | 1/1995 |
| JP | 9-304808 | 11/1997 |
| JP | 2001-188279 A | 7/2001 |

\* cited by examiner

*Primary Examiner* — W. B. Perkey
*Assistant Examiner* — Linda B Smith
(74) *Attorney, Agent, or Firm* — Sterne, Kessler, Goldstein & Fox PLLC

(57) ABSTRACT

A focal plane shutter for cameras includes: a shutter blade assembly; an electromagnet assembly; driving means that includes a mounting member mounted with an iron scrap member that cooperates with an iron core member of the electromagnet assembly; and a setting member that operates the driving means to a set position. The iron scrap member includes a shaft fitted in a mounting hole of the mounting member, an iron scrap portion provided at one end of the shaft and brought into contact with the iron core member, and a removal preventing flange provided at the other end of the shaft, a collar member is fitted to the shaft between the mounting hole and the flange, an edge of the mounting hole is formed to have an arcuate surface protruding toward the collar member, and the collar member is formed to have, on the edge side, an arcuate surface protruding toward the flange and substantially perpendicular to the arcuate surface.

2 Claims, 26 Drawing Sheets

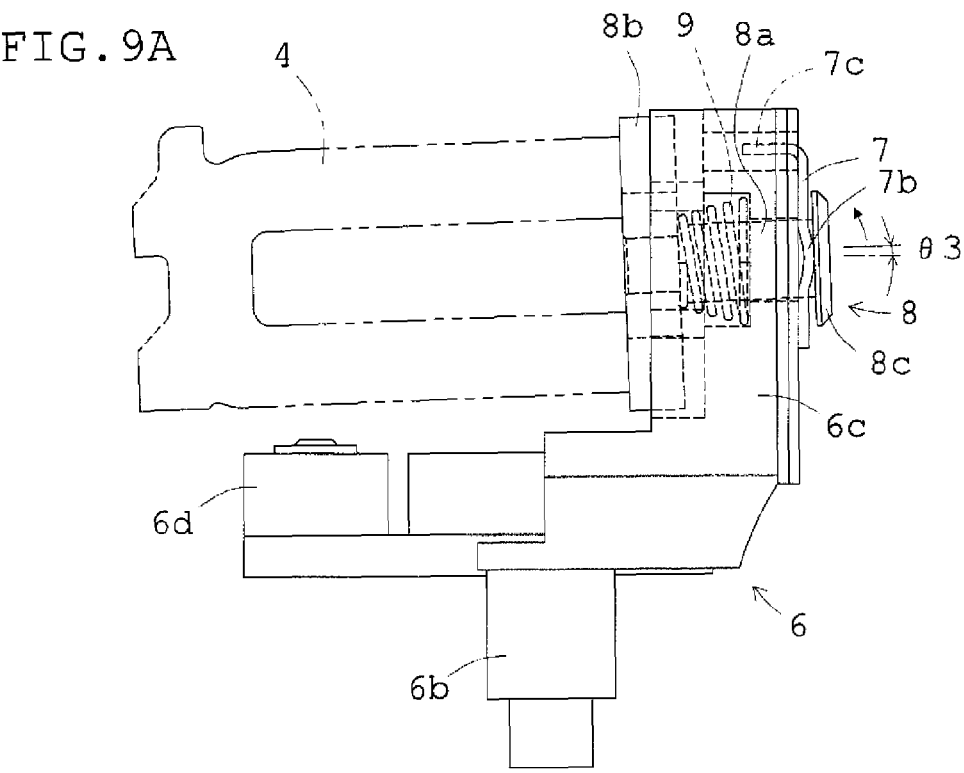
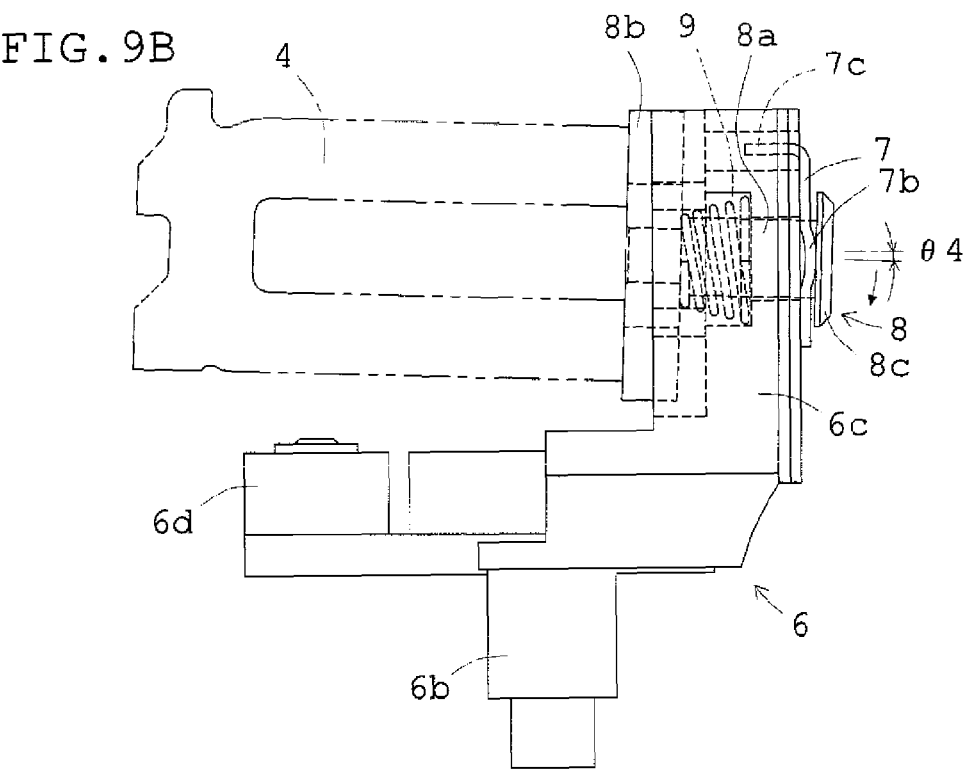

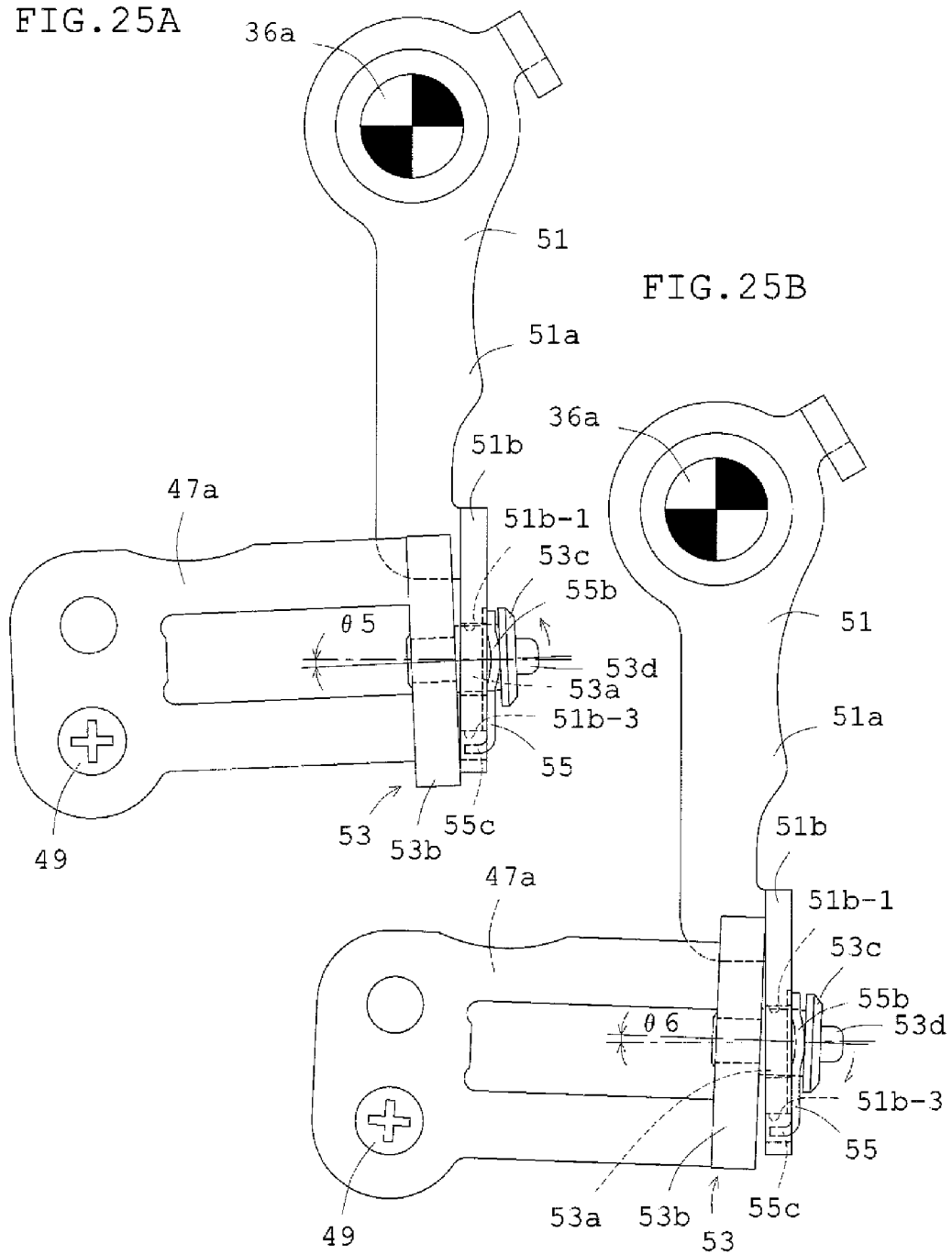

FOCAL PLANE SHUTTER FOR CAMERAS

CROSS-REFERENCE TO RELATED APPLICATIONS

This application is a Divisional of U.S. application Ser. No. 11/729,983 filed on Mar. 30, 2007 now U.S. Pat. No. 7,775,728, by ICHIHARA, Masakatsu et al., entitled FOCAL PLANE SHUTTER FOR CAMERAS, the entire contents of which is incorporated by reference and for which priority is claimed under 35 U.S.C. §120. As in the parent U.S. application Ser. No. 11/729,983, priority is claimed to Japan Application No. 2006-098801 filed on Mar. 31, 2006 and Japan Application No. 2007-073387 filed on Mar. 20, 2007, the entire contents of which are also incorporated by reference and for which priority is claimed under 35 U.S.C. §119.

BACKGROUND OF THE INVENTION

1. Field of the Invention

The present invention relates to a focal plane shutter for cameras having one or two shutter blades.

2. Background Art

Two types of focal plane shutters for cameras are known. One includes two shutter blades (a front blade and a rear blade) and the other includes one shutter blade. The former including two shutter blades has been adopted in silver film cameras and digital cameras, while the latter inducing one shutter blade has been adopted only in digital cameras. In the focal plane shutter of either type, each shutter blade is constituted by two arms individually pivoted at one end on a surface of a shutter base plate on a blade chamber side, and at least one blade pivoted on both of the arms.

A driving member for a shutter blade is rotatably mounted to a surface of the shutter base plate outside the blade chamber, and a driving pin thereof is connected to one arm of the shutter blade in the blade chamber. The driving member is rotated by a biasing force of a driving spring to rapidly move the shutter blade in photography, and rotated against the biasing force of the driving spring by a setting member to return the shutter blade to a set state in setting. The driving member deenergizes an electromagnet to start rotation as described above in photography, and a holding configuration of the driving member immediately before the start of rotation includes a locking type configuration and a direct type configuration.

As a typical locking type configuration, a configuration including a shutter blade driving mechanism described in Japanese Utility Model Publication No. 6-24825 and a control mechanism described in Japanese Utility Model Publication No. 4-3301 (a front blade system and a rear blade system are placed in opposite manner in the mechanisms in Japanese Utility Model Publication No. 6-24825 and Japanese Utility Model Publication No. 4-3301), and a configuration described in Japanese Utility Model Publication No. 7-3392. The former configuration includes a releasing member (an opening iron scrap lever 4 and a closing iron scrap lever 7 in Japanese Utility Model Publication No. 4-3301) for releasing a driving member locked by a locking member in photography, and includes a holding member (a first holding lever 10 in Japanese Utility Model Publication No. 4-3301) so that an iron scrap member (iron scraps 4a and 7a in Japanese Utility Model Publication No. 4-3301) mounted to the releasing member is maintained in contact with an iron core member of an electromagnet until a coil of an electromagnet (electromagnet coils 2 and 3 in Japanese Utility Model Publication No. 4-3301) is energized in photography, In the latter configuration, a holding member is not required for maintaining the contact state as described above, and a setting member of a driving member directly acts as the holding member.

On the other hand, a direct type configuration does not include a holding member, a locking member and a releasing member unlike the locking type configuration, and is configured so that an iron scrap member is mounted to a driving member, a setting member maintains the driving member in a set state against a biasing force of a driving spring until a coil of an electromagnet is energized in photography to maintain an iron core member of the electromagnet in contact with the iron scrap member as described in Japanese Patent Laid-Open Nos. 9-304808 and 2001-188279.

In the focal plane shutters having such configurations, having either one shutter blade or two shutter blades, or of either a locking type or a direct type, the electromagnet starts sucking and holding the iron scrap member when the coil of the electromagnet is energized in a stage immediately after a release and immediately before a start of photography as described above. Thus, if a sucked surface of the iron scrap member is tilted with respect to a sucking surface of the electromagnet at the start of energization, and both the surfaces are not in tight contact with each other, a sufficient sucking and holding force by the electromagnet cannot be obtained, and the driving member starts rotation by the biasing force of the driving spring before predetermined timing to cause the shutter blade to start an exposure operation. Thus, in order to always maintain the sucked surface of the iron scrap member in tight contact with the sucking surface of the electromagnet, various methods of improving a mounting configuration of an iron scrap member or an electromagnet have been proposed. Among the proposals, an improvement in a mounting configuration of an iron scrap member to a driving member is described in Japanese Patent Laid-Open Nos. 9-304808 and 2001-188279.

In a configuration described in Japanese Patent Laid-Open Nos. 9-304808 and 2001-188279, an iron scrap member has an iron scrap portion (an iron scrap in Japanese Patent Laid-Open No. 9-304808) at one end of a shaft (an iron scrap shaft in Japanese Patent Laid-Open No. 9-304808), and a flange (a head in Japanese Patent Laid-Open No. 2001-188279) at the other end, and the shaft is loosely fitted in a hole formed in a mounting portion of a driving member. Since the iron scrap member biases the iron scrap portion toward an electromagnet with a spring, the flange is in contact with an edge of a mounting hole formed in the mounting portion of the driving member when the iron scrap portion is not in contact with an iron core member of the electromagnet. If a sucked surface of the iron scrap portion is tilted with respect to a sucking surface of the iron core member when the iron scrap portion is brought into contact with the iron core member of the electromagnet in setting, a center line of the shaft of the iron scrap member is tilted with respect to a center line of the mounting hole so that the sucking surface and the sucked surface are brought into tight contact with each other. At this time, the flange is also tilted, but the edge of the mounting hole interferes with a peripheral portion of the flange to sometimes prevent the flange from being smoothly tilted. In order to prevent this, as specified in drawings of Japanese Patent Laid-Open Nos. 9-304808 and 2001-188279, it is known that the edge of the mounting hole is formed to have an arcuate surface. Besides, as described in Japanese Utility Model Laid-Open No. 56-53310, it is also known that two protrusions (protrusions 23d) are formed with the mounting hole therebetween.

Forming the edge of the mounting hole into such a shape is also desirable for other reasons. Specifically, in terms of production, it is difficult to stop rotation of the driving member at the moment when the iron core member and the iron scrap portion are brought into tight with each other in setting. For this reason, the driving member is actually produced to stop at timing as early as possible after the tight contact state is reliably obtained. Thus, in a setting completion state, the flange of the iron scrap member is placed away from the edge of the hole of the mounting portion as shown in FIG. 3 of Japanese Patent Laid-Open No. 9-304808 and FIG. 2 of Japanese Patent Laid-Open No. 2001-188279. With such a configuration, when the iron scrap member is sucked and held by the iron core member of the electromagnet and then a setting member having maintained the contact state between the members escapes in an initial stage of photography, the driving member is slightly rotated by the biasing force of the driving spring until the edge of the mounting hole abuts the flange of the iron scrap member. When the iron scrap member with the tilted shaft is brought into tight contact with the iron core member in setting as described above, the edge of the mounting hole abuts only part of the peripheral portion of the tilted flange.

When the edge of the mounting hole abuts only part of the peripheral portion of the flange, a force in abutment is not vertically applied to the sucked surface of the iron scrap member but is applied to tilt the sucked surface with respect to the sucking surface. Thus, even while the coil of the electromagnet is energized, the iron scrap member is easily separated from the iron core member of the electromagnet. If the iron scrap member is separated therefrom, the driving member starts an exposure operation with a shutter blade even though not at predetermined timing In order to prevent this, a suction force by the electromagnet may be increased, which increases the size of the electromagnet or consumption of a battery. Further, the edge of the mounting hole repeatedly abuts part of the peripheral portion of the tilted flange, the edge of the mounting hole is damaged, thereby preventing the tight contact state as described above from being obtained.

On the other hand, with the configuration such that the edge of the mounting hole abuts only part of the peripheral portion of the flange, when the coil of the electromagnet is deenergized, and the driving member starts rotation at predetermined timing, the edge of the mounting hole is brought into contact with the entire surface of the flange, and rattles at that time may affect a stable movement of the shutter blade. Thus, in this view, it is preferable to form the edge of the mounting hole to have the arcuate surface as described in Japanese Patent Laid-Open Nos. 9-304808 and 2001-188279, or form the two protrusions with the hole therebetween as described in Japanese Utility Model Laid-Open No. 56-53310. The mounting configuration of the iron scrap member has been described with the direct type configuration in mind, but the same applies to the locking type configuration described in Japanese Utility Model Publication Nos. 4-3301 and 7-3392. The present invention mainly relates to such a mounting configuration of the iron scrap member.

In the mounting configuration of the iron scrap member described in Japanese Patent Laid-Open Nos. 9-304808 and 2001-188279, the edge of the mounting hole is formed to have the arcuate surface as described above. Thus, this configuration is suitable when the iron scrap member is tilted on a surface parallel to a rotation surface of the driving member. However, when the iron scrap member is tilted on a surface perpendicular to the rotation surface of the driving member, there is little problem if a thickness of the mounting portion (a vertical dimension with respect to the rotation surface) is smaller than a diameter of the flange, but the iron scrap member cannot be suitably tilted if the thickness of the mounting portion is equal to or larger than the diameter of the flange, thereby preventing desired advantages from being sufficiently provided. Comparing FIGS. 1 and 6 in Japanese Patent Laid-Open No. 9-304808 in this view, the diameter of the flange is apparently smaller than the thickness of the mounting portion. Further, in the configuration described in Japanese Patent Laid-Open No. 9-304808, like the configuration of the electromagnet actually implemented, the iron core member is U-shaped and has two magnetic pole portions. Thus, in order to bring a substantially rectangular iron scrap portion into tight contact with the two magnetic pole portions, it is necessary that the iron core member is suitably tiltable in a direction perpendicularly to the rotation surface of the driving member. Also in the mounting configuration of the iron scrap member described in Japanese Utility Model Laid-Open No. 56-53310, the configuration is suitable when the iron scrap member is tilted on one plane, but does not allow the iron scrap member to be suitably tilted in a direction perpendicular to the plane.

BRIEF SUMMARY OF THE INVENTION

The present invention is achieved to solve these problems, and has an object to provide a focal plane shutter for cameras in which when a member for mounting an iron scrap member having an iron scrap portion at one end of a shaft and a flange at the other end via a compression spring brings the iron scrap portion into tight contact with an iron core member of an electromagnet against elasticity of the compression spring, the shaft of the iron scrap member can be suitably tilted, and when the member for mounting the iron scrap member is slightly operated until being stopped by the flange after the iron scrap portion is sucked by the iron core member from a state where the flange is placed away from a mounting portion of the iron scrap member, any tilt of the shaft of the iron scrap member does not cause the iron scrap member to abut part of an outer peripheral portion of the flange to be damaged or to be affected by an operation of a shutter blade.

In order to achieve the object, the present invention provides a focal plane shutter for cameras including: one or two shutter blades constituted by two arms and at least one blade pivoted on the arms; one or two electromagnets constituted by an iron core member and a coil; one or two driving means that includes a mounting member mounted with an iron scrap member, brings the iron scrap member into contact with the iron core member in setting, causes the iron scrap member to be sucked and held by the iron core member by energization of the coil in photography, and separates the iron scrap member from the iron core member to operate the shutter blade with a driving spring when the coil is deenergized; and a setting member that is operated from an initial position to operate the driving means to a set position against an biasing force of the driving spring in setting, and returns to the initial position before the shutter blade is operated in photography, wherein the iron scrap member includes a shaft fitted in a mounting hole of the mounting member, an iron scrap portion provided at one end of the shaft and brought into contact with the iron core member, and a removal preventing flange provided at the other end of the shaft, a collar member is fitted to the shaft between the mounting hole and the flange, an edge of the mounting hole is formed to have an arcuate surface protruding toward the collar member, and the collar member is formed to have, on the flange side, an arcuate surface protruding toward the flange and substantially perpendicular to the arcuate surface.

In this case, the driving means is the mounting member connected to the shutter blade and rotated by elasticity of the driving spring in photography, the setting member rotates the mounting member against the elasticity of the driving spring to bring the iron scrap member into contact with the iron core member in setting, and returns to the initial position after the coil is energized in photography, thereby obtaining a good direct type focal plane shutter for cameras.

Alternatively, the driving means includes a driving member connected to the shutter blade and rotated by elasticity of the driving spring in photography, a locking member that locks the driving member in a set position, the mounting member that releases the lock of the driving member by the locking member when the coil is deenergized in photography, and a holding member that presses the mounting member to bring the iron scrap member into contact with the iron core member in setting and releases the press after the coil is energized, thereby obtaining a good locking type focal plane shutter for cameras.

Alternatively, the driving means includes a driving member connected to the shutter blade and rotated by elasticity of the driving spring in photography, a locking member that locks the driving member in a set position, the mounting member that is operated together with the driving member to the set position by the setting member in setting, and releases the lock of the driving member by the locking member when the coil is deenergized after the setting member returns to the initial position in photography, thereby obtaining another good locking type focal plane shutter for cameras.

In these focal plane shutters, two protrusions may be formed, with the mounting hole therebetween, on the edge of the mounting hole instead of the arcuate surface, and the protrusions may be placed to correspond to a top of the arcuate surface. A hole of the collar member fitted on the shaft is formed to be a slot that is long in a tangential direction on the top of the arcuate surface of the collar member, thereby allowing the iron scrap member to be smoothly tilted. Further, the collar member may be made of metal or synthetic resin. When made of synthetic resin, it is more preferable that the collar member has a recess in a periphery of the mounting hole in a surface on the flange side, and the arcuate surface is formed in the recess.

The present invention provides the focal plane shutter for cameras in which an iron scrap member having the iron scrap portion at one end of the shaft and the flange at the other end, the sucked surface of the iron scrap portion is brought into tight contact with the sucking surface of the iron core member of the electromagnet by elasticity of the spring in setting, sucked and held by the iron core member when the coil of the electromagnet is energized in an initial stage of a release of a camera, then separated from the iron core member when the coil is deenergized, thereby allowing the shutter blade to be moved by the driving member, wherein the edge of the mounting hole of the iron scrap member is formed to have the arcuate surface as is conventional, and the collar member having a special shape is fitted to the shaft of the iron scrap member in contact with the arcuate surface and the flange. Thus, when the iron scrap portion of the iron scrap member is brought into tight contact with the iron core member, the shaft of the iron scrap member can be smoothly tilted. Also, when the iron scrap portion is brought into tight contact with the iron core member, any tilt of the shaft does not cause only part of the outer peripheral portion of the flange to abut the mounting portion of the iron scrap member, thereby always allowing a stable exposure operation of the shutter blade.

This and other objects as well as the features and advantages of the present invention will become apparent from the following detailed description of the preferred embodiments when taken in conjunction with the accompanying drawings.

BRIEF DESCRIPTION OF THE DRAWINGS/FIGURES

FIGS. 9A and 9B show a state where the shaft of the iron scrap member mounted to the front blade driving member in Embodiment 1 is tilted, and show a state of a counterclockwise tilt and a clockwise tilt, respectively, from the state in FIG. 3;

FIGS. 25A and 25B are plan views showing a state where a shaft of an iron scrap member mounted to a front blade releasing member in Embodiment 2 is tilted, and show a state of a counterclockwise tilt and a clockwise tilt, respectively, in the state in FIG. 14;

Figure 14:
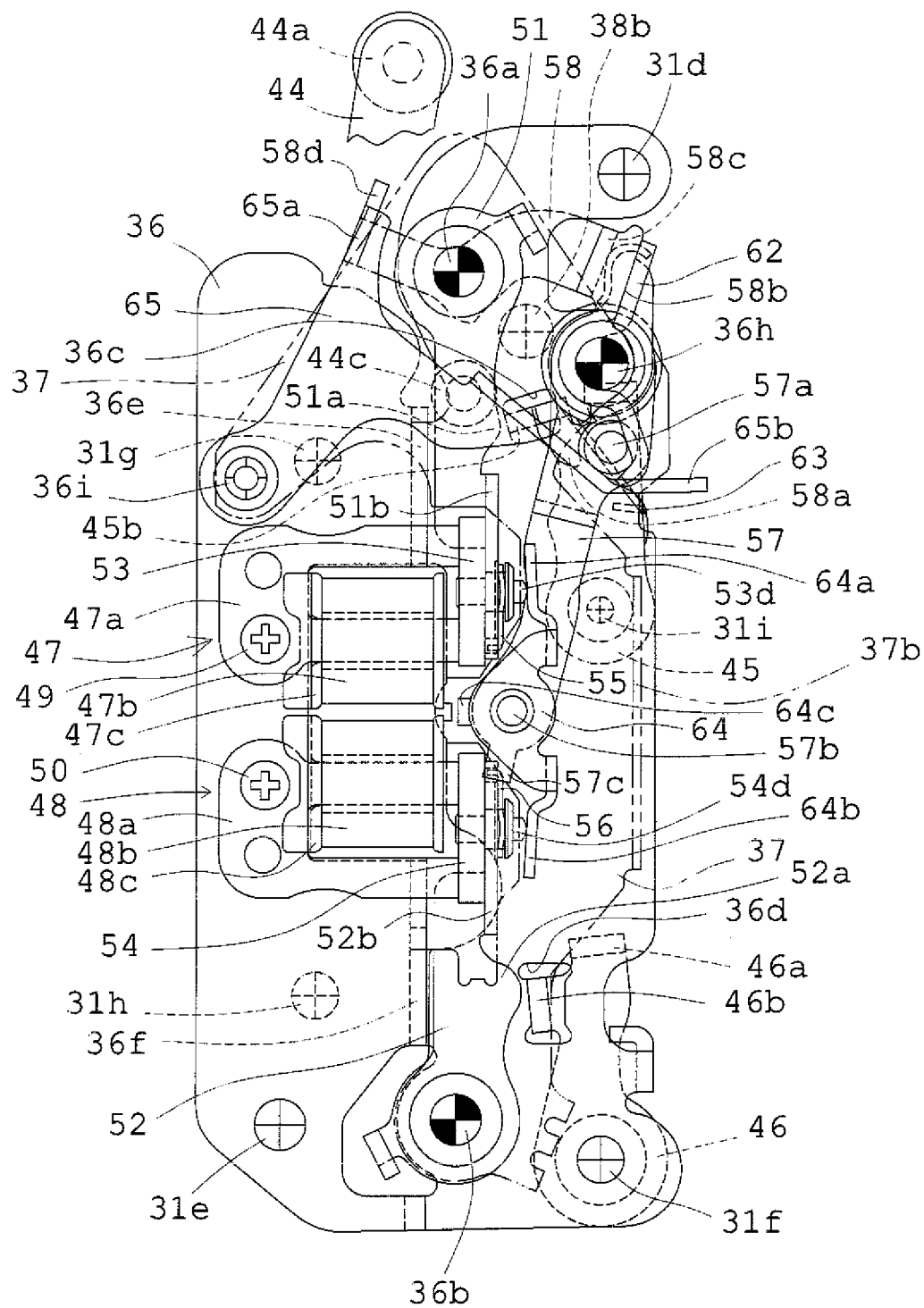
FIG. 14 is a plan view of Embodiment 2 showing a lock releasing mechanism in the set state.
Figure 26A:
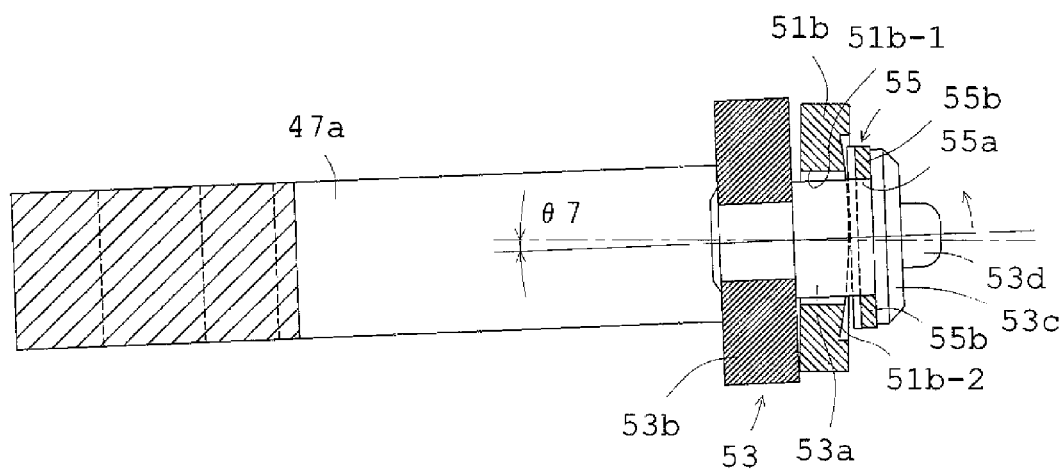
Figure 26B:
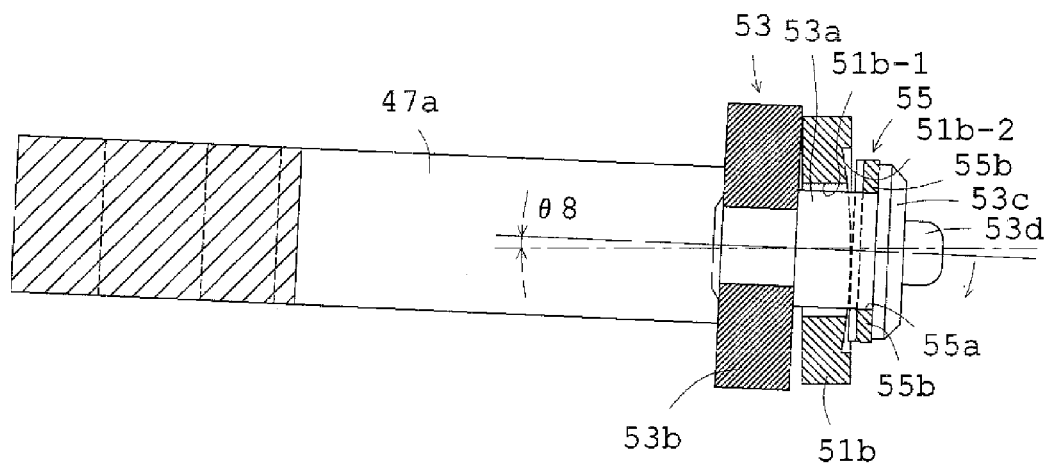
Figure 27A:
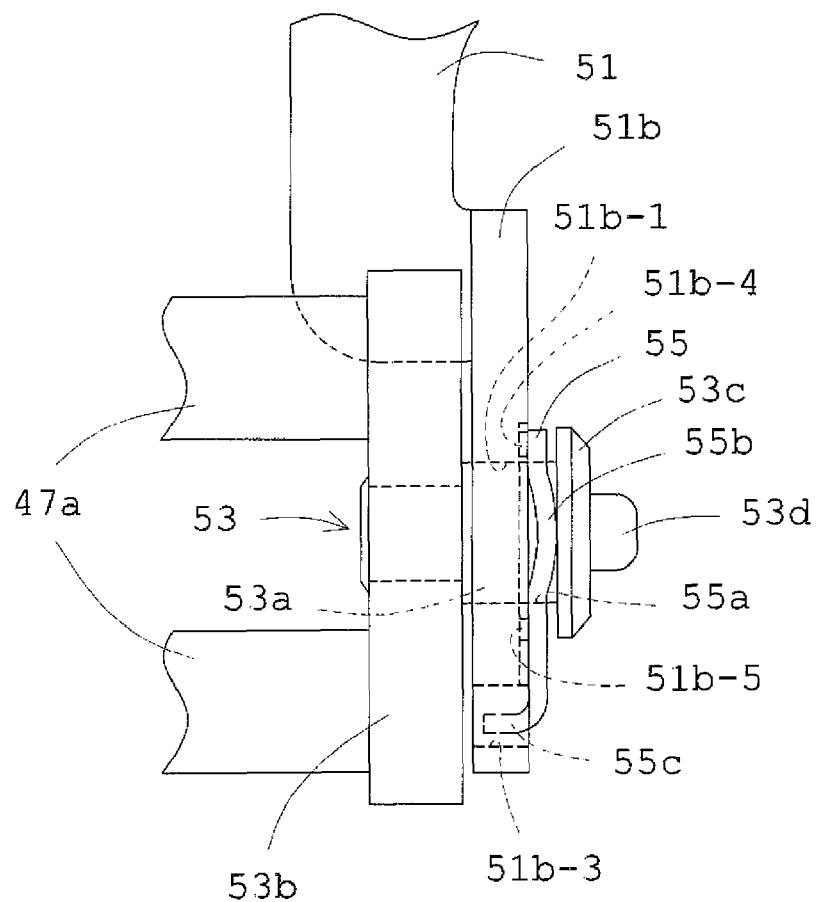
Figure 27B:
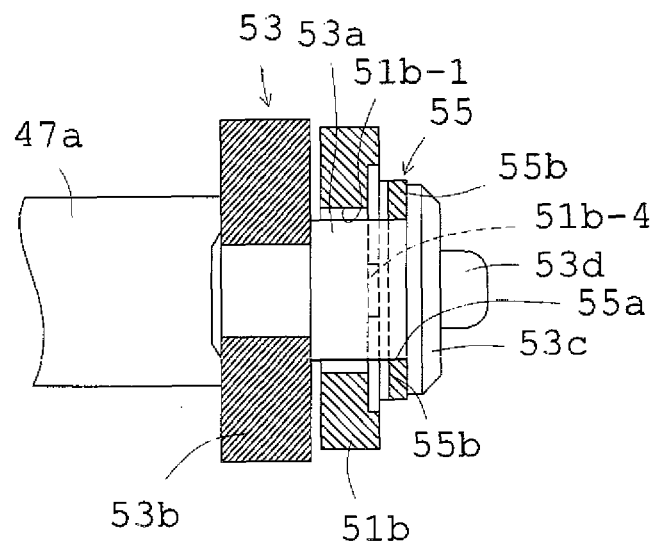

FIGS. 26A and 26B are plan views showing a state where the shaft of the iron scrap member mounted to the front blade releasing member in Embodiment 2 is tilted, and show a state of a counterclockwise tilt and a clockwise tilt, respectively, in the state in FIG. 14; and FIGS. 27A and 27B are a plan view and a sectional view, respectively, of a variation of the front blade releasing member in FIGS. 25 and 26.

DETAILED DESCRIPTION OF THE INVENTION

Now, the present invention will be described with two embodiments. As described above, the present invention can be applied to a focal plane shutter for cameras having one or two shutter blades, and of a locking type or a direct type. Embodiment 1 relates to a direct type focal plane shutter including two shutter blades, and Embodiment 2 relates to a locking type focal plane shutter including two shutter blades.

Embodiment 1

Figure 1:
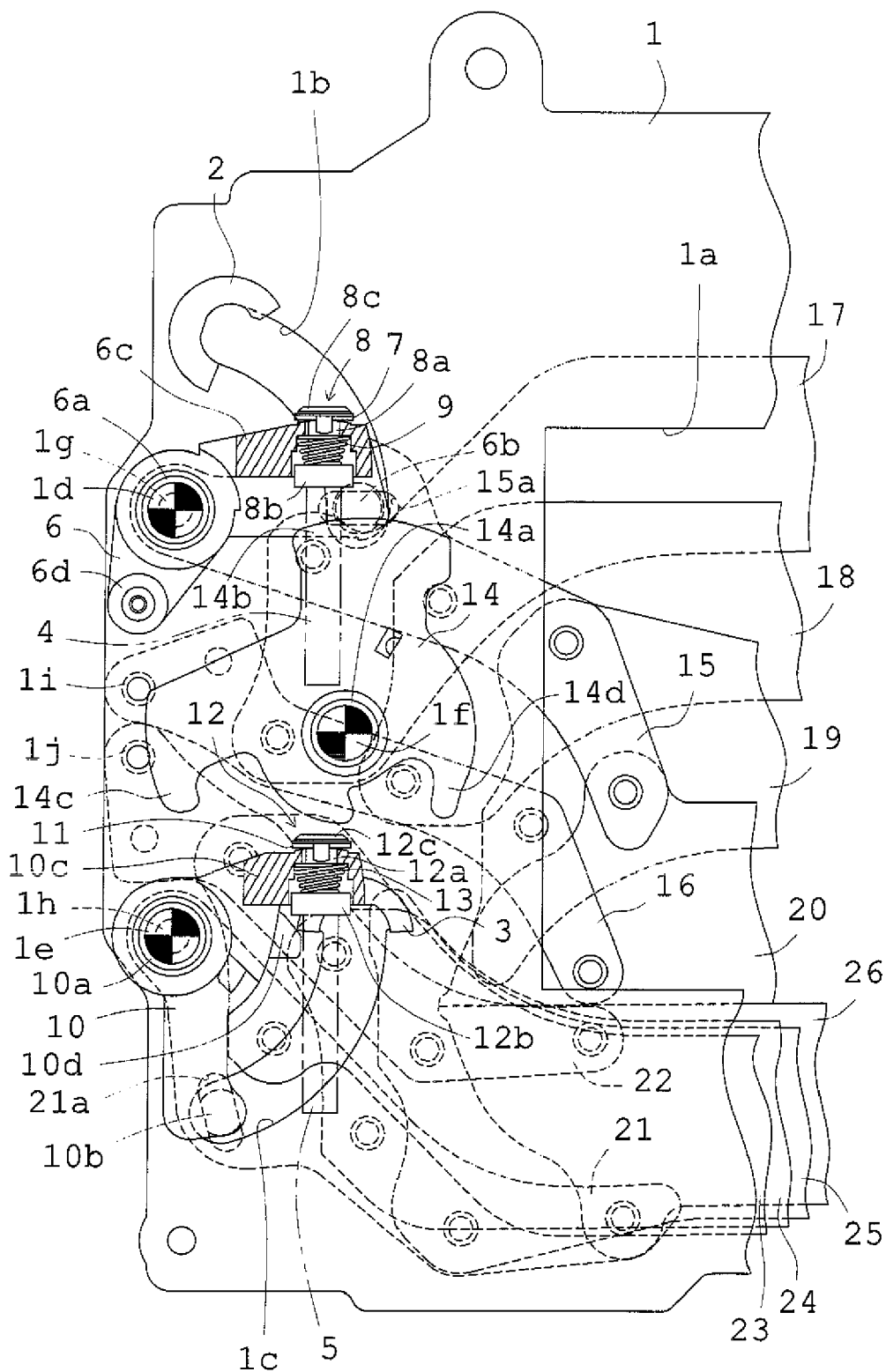
FIG. 1 is a plan view of Embodiment 1 of the present invention showing a state immediately before an exposure operation is started.
Figure 2:
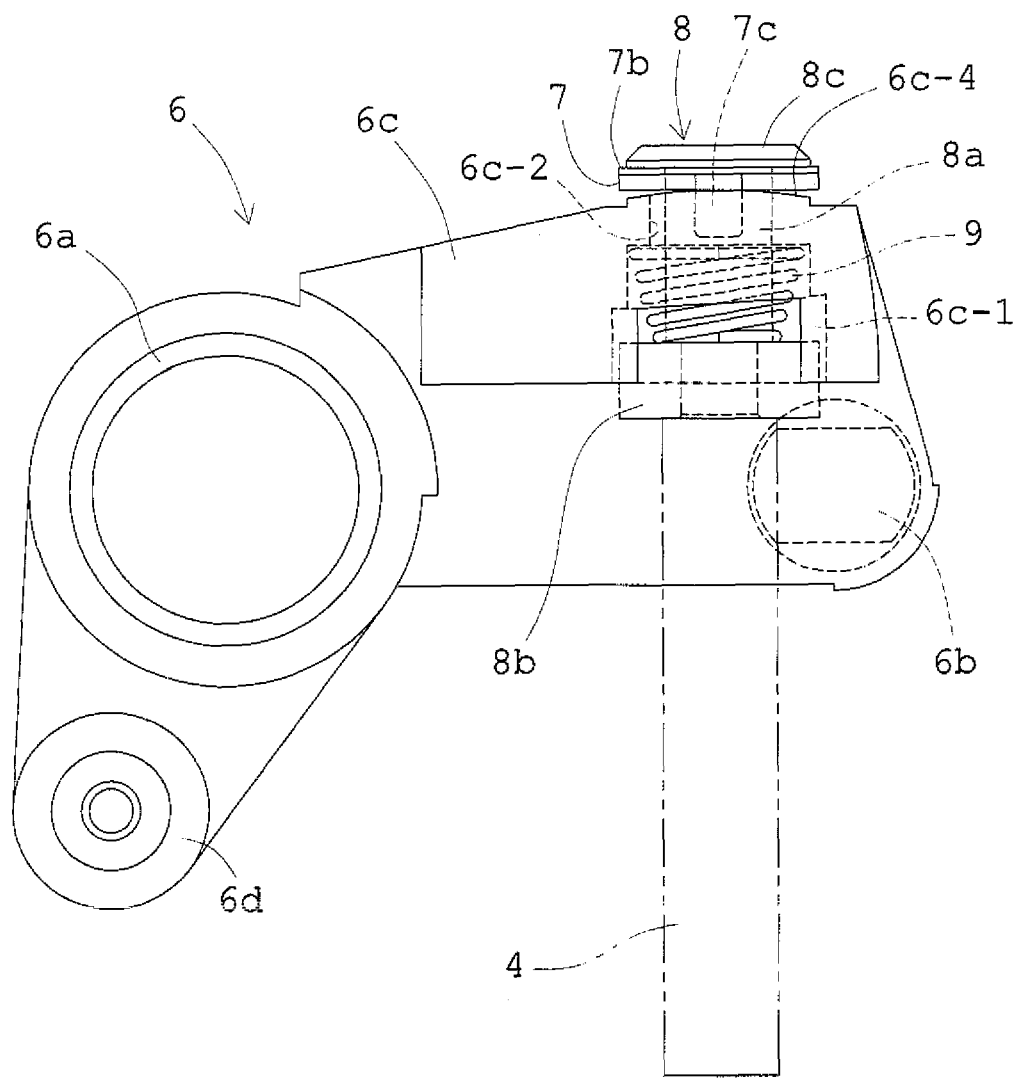
FIG. 2 is an enlarged plan view of a front blade driving member in the state in FIG. 1.
Figure 3:
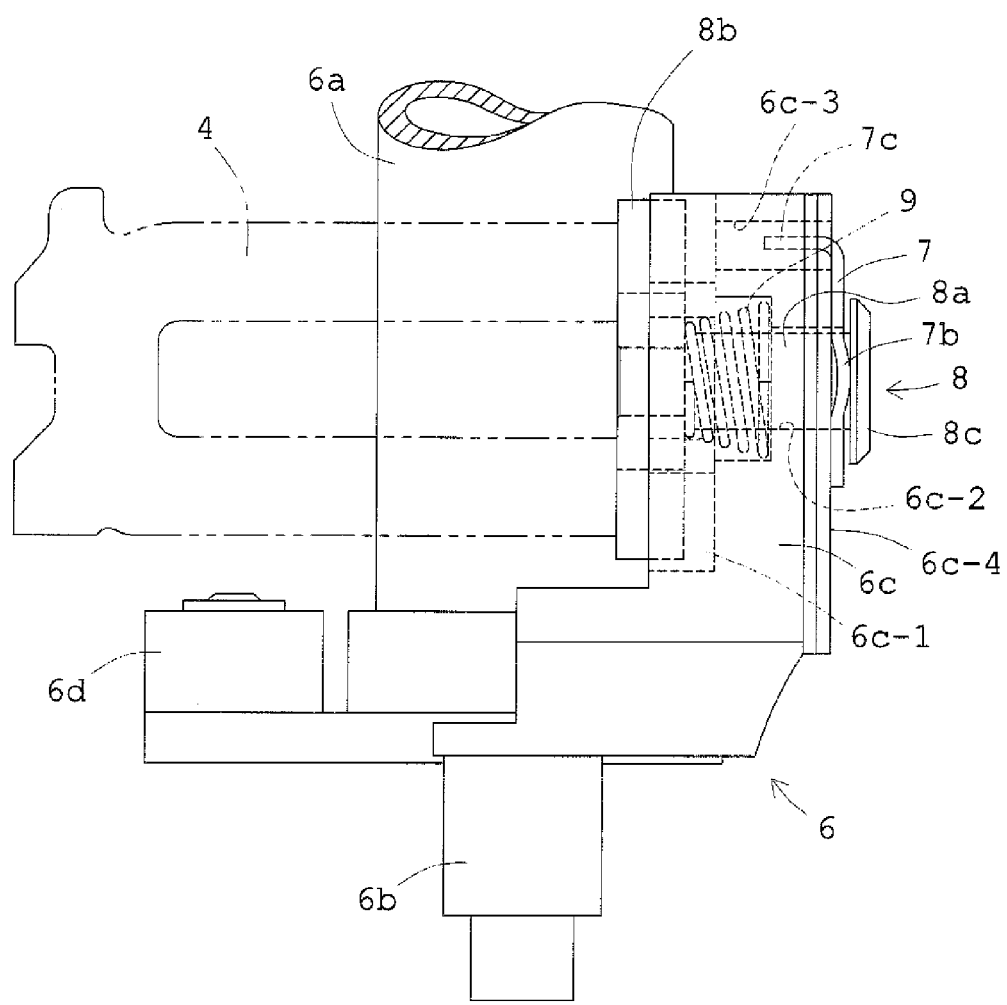
FIG. 3 is a side view, partially omitted, of the front blade driving member viewed from the right in FIG. 2.
Figure 4A:
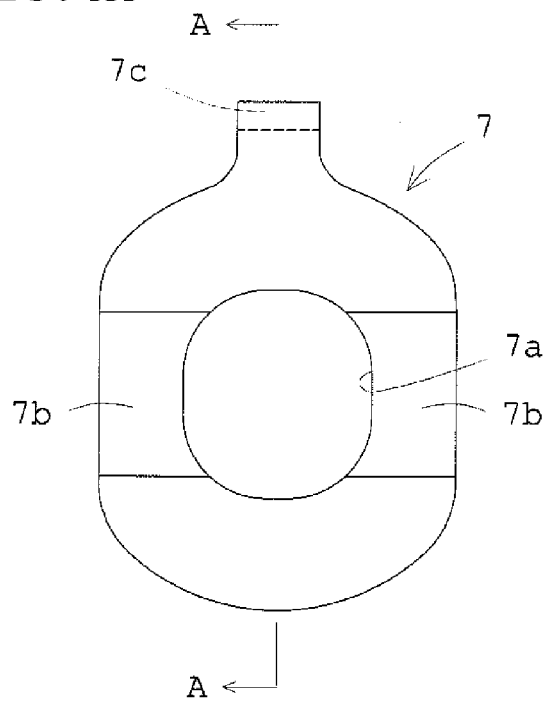
FIGS. 4A and 4B are a plan view and a sectional view taken along the line A-A in FIG. 4A, respectively, of a collar member mounted to the front blade driving member in Embodiment 1.
Figure 4B:
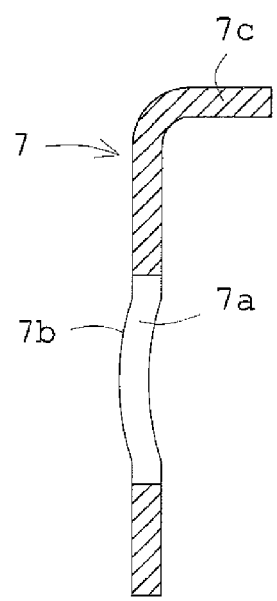
Figure 5A:
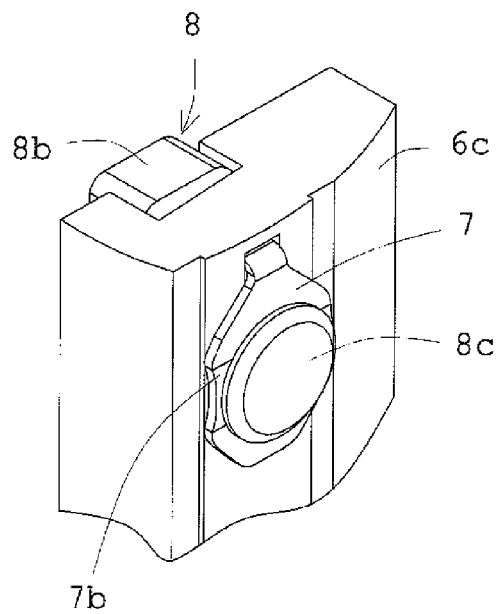
FIGS. 5A and 5B are perspective views of a mounting state of the collar member and the iron scrap member to the front blade driving member in Embodiment 1, and show a state viewed from a flange side of an iron scrap member and a state viewed from an iron scrap portion side of the iron scrap member, respectively.
Figure 5B:
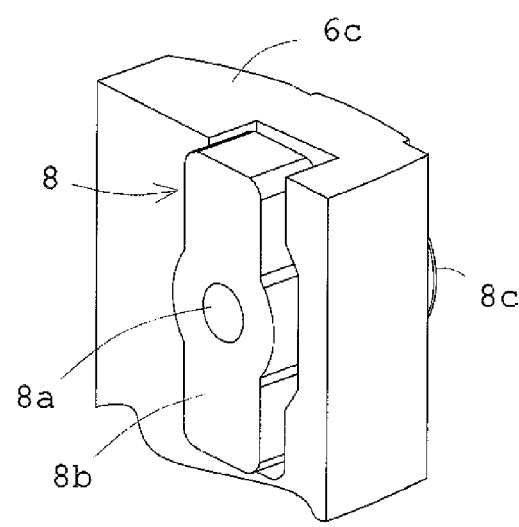
Figure 6:
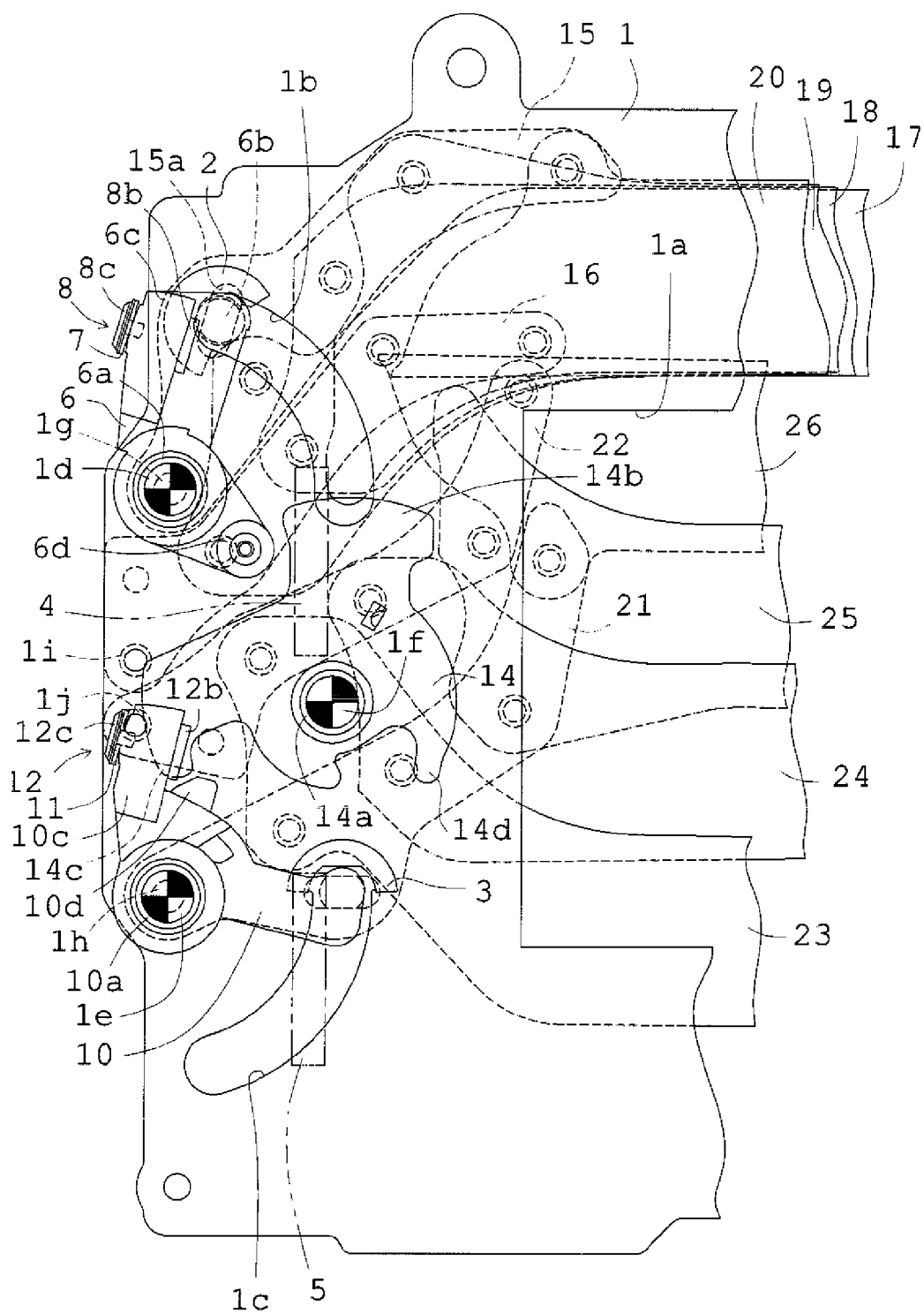
FIG. 6 is a plan view of Embodiment 1 showing a state immediately after the exposure operation is finished.
Figure 7:
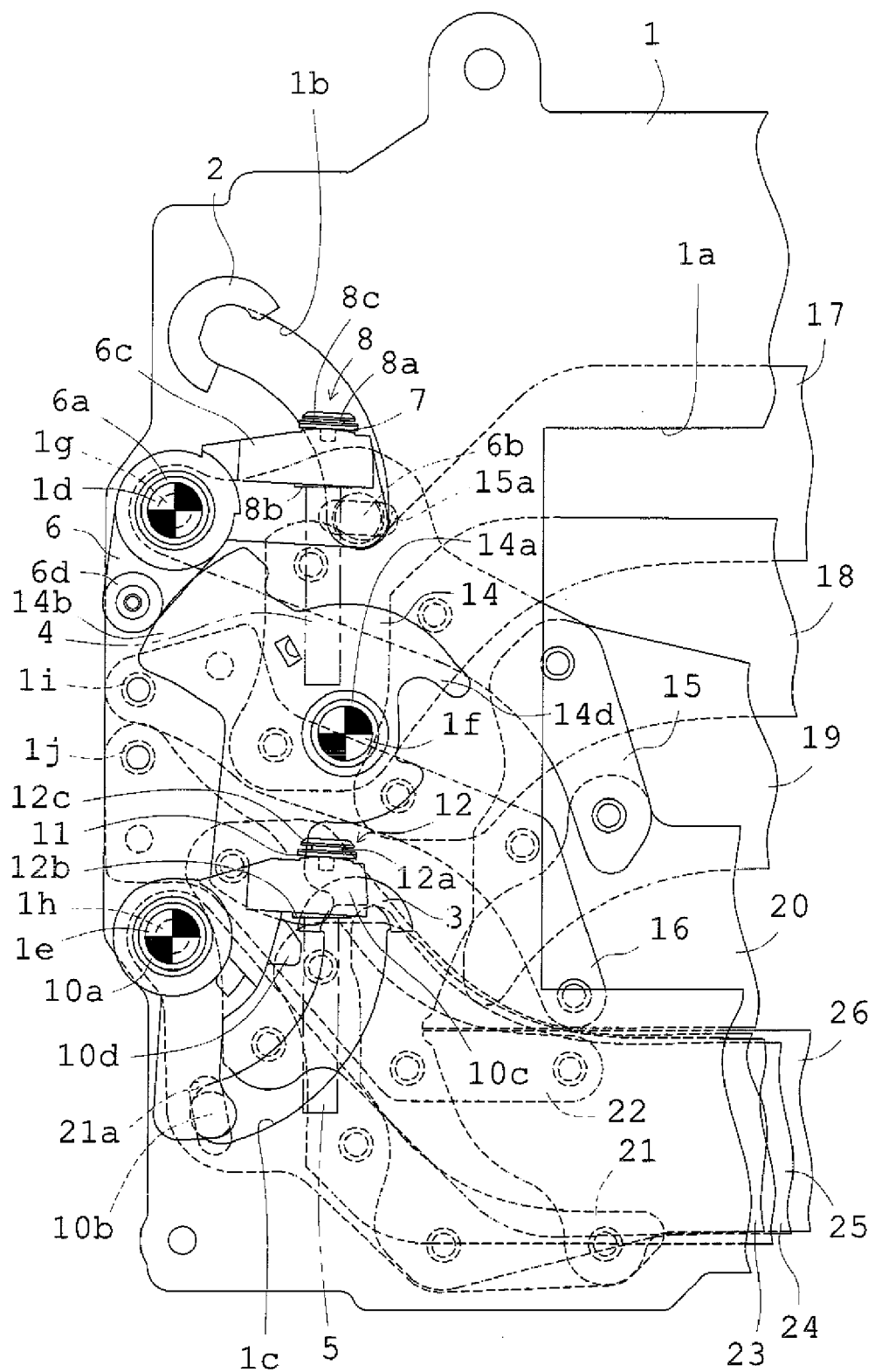
FIG. 7 is a plan view of Embodiment 1 showing a set state.
Figure 8A:
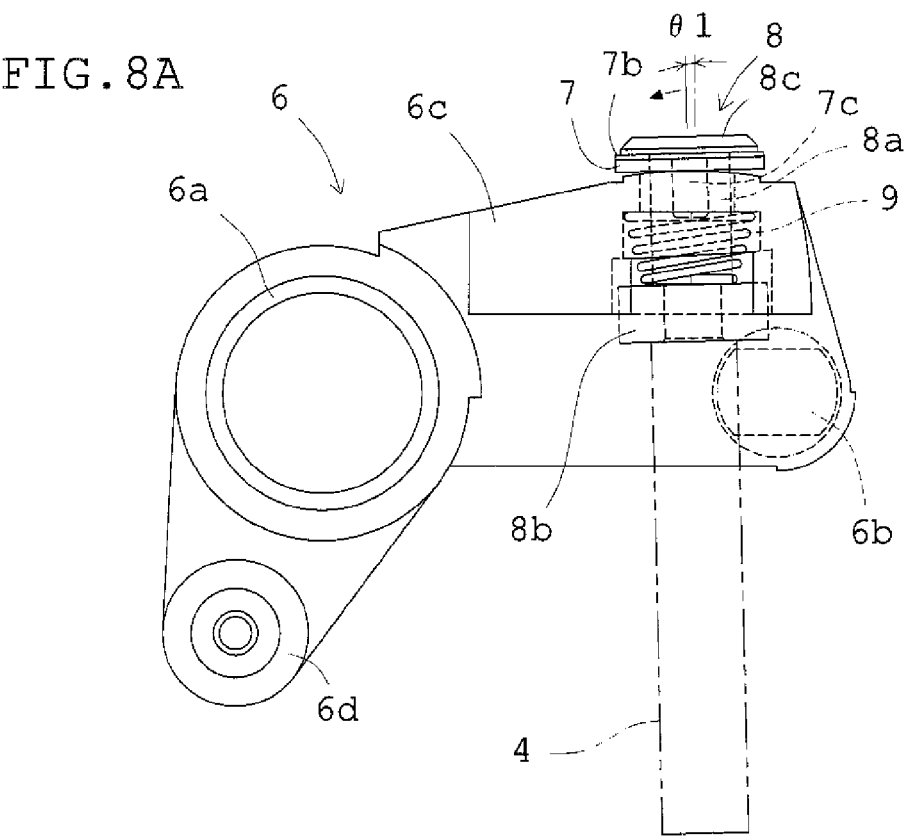
FIGS. 8A and 8B show a state where a shaft of the iron scrap member mounted to the front blade driving member in Embodiment 1 is tilted, and show a state of a counterclockwise tilt and a clockwise tilt, respectively, from the state in FIG. 2.
Figure 8B:
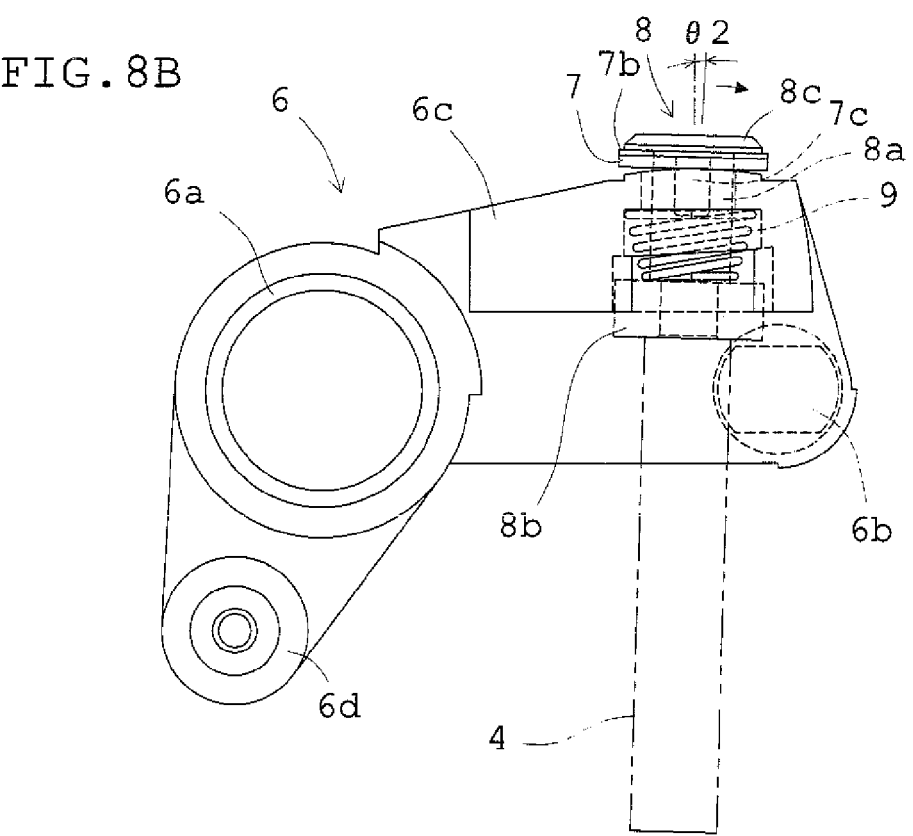

Embodiment 1 will be described with reference to FIGS. 1 to 9. FIG. 1 is a plan view showing a state immediately before an exposure operation is started. FIG. 2 is an enlarged plan view of a front blade driving member in the state in FIG. 1, and FIG. 3 is a side view, partially omitted, of the front blade driving member viewed from the right in FIG. 2. FIG. 4 shows a collar member mounted to the front blade driving member, FIG. 4A is a plan view and FIG. 4B is a sectional view taken along the line A-A in FIG. 4A. FIG. 5 is a perspective views of a mounting state of the collar member and the iron scrap member 8 to the front blade driving member, FIG. 5A is a view from a flange side of an iron scrap member, and FIG. 5B is a view from an iron scrap portion side of the iron scrap member. FIG. 6 is a plan view showing a state immediately after the exposure operation is finished, and FIG. 7 is a plan view showing a set state. FIGS. 8 and 9 show a state where a shaft of the iron scrap member mounted to the front blade driving member is tilted, FIG. 8A shows a state of a counterclockwise tilt from the state in FIG. 2, FIG. 8B shows a state of a clockwise tilt from the state in FIG. 2, FIG. 9A shows a state of a counterclockwise tilt from the state in FIG. 3, and FIG. 9B shows a state of a clockwise tilt from the state in FIG. 3. FIGS. 1, 6 and 7 are plan views showing substantially the left half viewed from a subject side.

First, a configuration of the embodiment will be described. In FIG. 1, a shutter base plate 1 has, substantially in the center thereof, an aperture 1a for a subject optical path having a horizontally oriented rectangular shape. FIG. 1 shows substantially the left half of the embodiment viewed from the subject side, and only part of the aperture 1a is shown. On a back side of the shutter base plate 1, an unshown intermediate plate and an auxiliary base plate are mounted in the order at a predetermined distance therebetween, a blade chamber of a front blade described later is formed between the shutter base plate 1 and an intermediate plate, and a blade chamber of a rear blade described later is formed between the intermediate plate and an auxiliary base plate. As known, the intermediate plate and the auxiliary base plate each have substantially the same size as the shutter base plate 1, and have an aperture for a subject optical path in a region overlapping the aperture 1a. In this example, the aperture 1a controls an exposure aperture.

The shutter base plate 1 has two arcuate slots 1b and 1c on the left of the aperture 1a. At upper ends of the slots 1b and 1c, known shock absorbing members 2 and 3 are mounted made of rubber and having a C-shaped plane. Shafts 1d, 1e and if stand on a subject side, that is, a surface side of the shutter base plate 1, and shafts 1g, 1h, 1i and 1j stand on the back side. Among them, the shafts 1d and 1g and the shafts 1e and 1h stand concentrically. On the shutter base plate 1, an unshown plurality of shafts also stand on the surface side. A support plate and a printed-wiring board that are not shown are mounted in a stacked manner to tips of the shafts in parallel with the shutter base plate 1. A front blade electromagnet and a rear blade electromagnet are mounted to the side of the shutter base plate 1 of the support plate. In the drawings, only an iron core member 4 of the front blade electromagnet and an iron core member 5 of the rear blade electromagnet are shown by dash-double-dot lines. As shown in FIG. 3, the iron core members 4 and 5 are II-shaped and have magnetic pole portions at tips of two legs, around one of which an unshown coil is wound.

A front blade driving member (mounting member) 6 made of synthetic resin is rotatably mounted to the shaft 1d of the shutter base plate 1, and biased to be rotated counterclockwise by an unshown front blade driving spring. FIG. 2 shows the front blade driving member 6 in an enlarged manner in the state in FIG. 1, and FIG. 3 shows the front blade driving member 6 viewed from the right in FIG. 2. The front blade driving member 6 has a cylindrical portion 6a fitted to the shaft 1d, a driving pin 6b, and a mounting portion 6c, and is mounted with a roller 6d. In FIG. 3, the cylindrical portion 6a is partly shown. The driving pin 6b is provided on the side of the shutter base plate 1 and passes through the slot 1b. A root thereof having a circular section can abut the shock absorbing member 2, and a tip having an oval section is connected to a front blade described later in the blade chamber.

As is apparent from FIG. 3, the mounting portion 6c of the front blade driving member 6 is formed to be higher on the subject side, but is shown in FIG. 1 in a section taken in parallel with the shutter base plate 1 for the sake of clarity of the inside. Now, the shape of the mounting portion 6c and a member mounted thereto will be described. Reference numerals of details of the mounting portion 6c for the description are denoted only in FIGS. 2 and 3. As shown in FIG. 3, the mounting portion 6c has an accommodation chamber 6c-1 with an open left side, and a mounting hole 6c-2 passing through to the right from the accommodation chamber 6c-1. The accommodation chamber 6c-1 has two-step compartments. A larger compartment is opened at an upper side as shown in FIG. 2, and the opening portion is not shown in FIGS. 5 and 6. As shown in FIG. 3, a hole 6c-3 passing through to the right from the larger compartment is formed above the mounting hole 6c-2. As is apparent from FIG. 2, the right side of the mounting portion 6c has an arcuate surface 6c-4. The arcuate surface 6c-4 is formed so that a ridge on tops on both sides of the mounting hole 6c-2 is substantially vertical to the shutter base plate 1. In this embodiment, the entire right surface (upper surface in FIG. 2) of the mounting portion 6c is an arcuate surface, but only a region near an edge of the mounting hole 6c-2 may have an arcuate surface.

To the mounting portion 6c having such a shape, a collar member 7, an iron scrap member 8, and a compression spring 9 are mounted. The collar member 7 in FIG. 4 has a hole 7a substantially in the center as shown in FIG. 4A, arcuate portions 7b and 7b having a shape as shown in FIG. 4B on right and left sides of the hole 7a, and a bent portion 7c above the hole 7a. As shown in FIG. 3, in a state where the bent portion 7c of the collar member 7 is loosely inserted into the hole 6c-3, ridges on tops of arcuate surfaces of arcuate portions 7b and 7b are perpendicular to the ridge on the top of the arcuate surface 6c-4. In this embodiment, the hole 7a is not circular, but is formed as a slot that is slightly long in a direction substantially perpendicular to the ridge on the tops of the arcuate surfaces of the arcuate portions 7b and 7b. Reference numerals of details of the collar member 7 are denoted only in FIGS. 2 to 4, and omitted in other drawings.

Next, the iron scrap member 8 has a shaft 8a loosely fitted in the mounting hole 6c-2 of the mounting portion 6c and the hole 7a of the collar member 7, an iron scrap portion 8b mounted to one end of the shaft 8a and having a part accommodated in the accommodation chamber 6c-1, and a flange 8c formed on the other end of the shaft 8a. The iron scrap portion 8b is elastically biased in a direction protruding from the accommodation chamber 6c-1 by a compression spring 9 fitted on the shaft 8a in the accommodation chamber 6c-1. The iron scrap portion 8b has a surface always generally facing the outside of the accommodation chamber 6c-1 as a sucked surface facing the two magnetic pole portions of the iron core member 4. FIG. 5 is a perspective view of a state where the collar member 7 and the iron scrap member 8 are thus mounted to the mounting portion 6c of the front blade driving member 6, FIG. 5A is a view from the side of the flange 8c of the iron scrap member 8, and FIG. 5B is a view from the side of the iron scrap portion 8b of the iron scrap member 8.

In FIG. 1, a rear blade driving member 10 made of synthetic resin is rotatably mounted to the shaft 1e of the shutter base plate 1, and elastically biased to be rotated counterclockwise by an unshown rear blade driving spring. The rear blade driving member 10 has a cylindrical portion 10a fitted to the shaft 1e, a driving pin 10b, a mounting portion 10c, and a pressed portion 10d. The driving pin 10b is provided on the side of the shutter base plate 1 and passes through the slot 1c, a root having a D-shaped section can abut the shock absorbing member 3, and a tip having an oval section is connected to the rear blade described later in the blade chamber. As is apparent from the later description on operation, the pressed portion 10d is formed one step closer to the shutter base plate 1.

The mounting portion 10c is formed to be higher on the subject side like the mounting portion 6c. The shape of the mounting portion 10c is substantially the same as that of the mounting portion 6c. Thus, the detailed description thereof will be omitted. All the descriptions on the mounting portion 6c apply to the mounting portion 10c. A collar member 11 is mounted to the mounting portion 10c, and has totally the same shape and mounting method as the collar member 7, and thus the description thereof will be omitted. Further, an iron scrap member 12 is mounted to the mounting portion 10c. The iron scrap member 12 has a shaft 12a loosely fitted in a mounting hole of the mounting portion 10 and a hole of the collar member 11, and an iron scrap portion 12b mounted to one end of the shaft 12a and having a part accommodated in an accommodation chamber of the mounting portion 10, and a flange 12c formed on the other end of the shaft 12a. The iron scrap portion 12b is elastically biased in a direction protruding from the accommodation chamber by a compression spring 13 fitted on the shaft 12a in the accommodation chamber. The iron scrap portion 12b has a surface always generally facing the outside of the accommodation chamber as a sucked surface facing two magnetic pole portions of the iron core member 5.

A setting member 14 made of synthetic resin is rotatably mounted to the shaft 1f of the shutter base plate 1. The setting member 14 has a cylindrical portion 14a fitted to the shaft if, a pressing portion 14b that presses the roller 6d of the front blade driving member 6, a pressing portion 14c that presses the pressed portion 10d of the rear blade driving member 10, and a pressed portion 14d, and is biased to be rotated clockwise by a known return spring that is not shown. An engagement pin is provided on the back side of the setting member 14, and inserted into an unshown arcuate slot formed in the shutter base plate 1, which is known and thus not shown. FIG. 1 shows a state where the setting member 14 is rotated clockwise by a biasing force of the return spring, and the engagement pin abuts an end of the arcuate slot and is stopped. For the setting member 14, this rotation position is hereinafter referred to as an initial position.

Next, configurations of the front blade and the rear blade will be described. First, the front blade includes two arms 15 and 16 having one ends rotatably mounted to the shafts 1g and 1i of the shutter base plate 1, and four blades 17, 18, 19 and 20 pivoted on the arms 15 and 16 via a known connection shaft, and a blade 20 pivoted on tips of the arms 15 and 16 is a slit forming blade. For the arrangement thereof, the arms 15 and 16 are placed closest to the shutter base plate 1, and the blade 20, the blade 19, the blade 18, and the blade 17 are placed in the order toward the intermediate plate side. The arm 15 has a slot 15a in which a tip of the driving pin 6b of the front blade driving member 6 is fitted.

On the other hand, the rear blade includes two arms 21 and 22 having one ends rotatably mounted to the shafts 1h and 1j of the shutter base plate 1, and four blades 23, 24, 25 and 26 pivoted on the arms 21 and 22 via connection shafts, and a blade 26 pivoted on tips of the arms 21 and 22 is a slit forming blade. The arrangement thereof is opposite to that of the front blade, the arms 21 and 22 are placed closest to the auxiliary base plate, and the blade 26, the blade 25, the blade 24, and the blade 23 are placed in the order toward the intermediate plate. The arm 21 has a slot 21a in which a tip of the driving pin 10b of the rear blade driving member 10 is fitted. In the embodiment, the front blade and the rear blade each have four blades, but the number thereof is not limited, and the front blade and the rear blade each may have one blade, or the front blade and the rear blade may have blades of different numbers.

Next, an operation of the embodiment will be described. FIG. 1 shows a state immediately before a start of an exposure operation. Specifically, FIG. 1 shows a state where a camera has been released, coils of the front blade electromagnet and the rear blade electromagnet are energized, the iron scrap portions 8b and 12b of the iron scrap members 8 and 12 mounted to the driving members 6 and 10 are magnetically sucked by the iron core members 4 and 5 of the electromagnets, and the setting member 14 is then returned to the initial position by the biasing force of the unshown return spring and stopped. Thus, in this state, the driving members 6 and 10 are held in an exposure operation start position against elasticity of the unshown driving springs, the four blades 17 to 20 of the front blade are spread with a small amount of mutual overlapping of adjacent blades to cover the aperture 1a, and the four blades 23 to 26 of the rear blade are stacked with a large amount of mutual overlapping of adjacent blades and stored below the aperture 1a.

In this manner, when the setting member 14 is returned to the initial position after the release, the unshown coil of the front blade electromagnet is first deenergized, and the front blade driving member 6 starts counterclockwise rotation by the biasing force of the unshown front blade driving spring. Thus, the driving pin 6b of the front blade driving member 6 rotates the arm 15 counterclockwise, and the four blades 17 to 20 of the front blade are operated upward with an increasing amount of mutual overlapping of the adjacent blades to open the aperture 1a at a lower edge of the slit forming blade 20.

When a predetermined time has passed since the coil of the front blade electromagnet is deenergized, the coil of the rear blade electromagnet is deenergized. Thus, the rear blade driving member 10 is rotated counterclockwise by the biasing force of the unshown rear blade driving spring. Thus, the driving pin 10b of the rear blade driving member 10 rotates the arm 21 counterclockwise, and the four blades 23 to 26 of the rear blade are operated upward with a decreasing amount of mutual overlapping of the adjacent blades to close the aperture 1a at an upper edge of the slit forming blade 26. Thus, thereafter, photosensitive surfaces of a film or imaging surfaces of a solid-state image pickup device are continuously exposed by a slit formed between the two slit forming blades 20 and 26.

When the four blades 17 to 20 of the front blade are then stacked and moved upward away from the aperture 1a, the driving pin 6b of the front blade driving member 6 abuts the shock absorbing member 2 mounted on an upper end surface of the slot 1b and is stopped. When the four blades 23 to 26 of the rear blade are spread to fully cover the aperture 1a, the driving pin 10b of the rear blade driving member 10 abuts the shock absorbing member 3 mounted on an upper end surface of the slot 1c and is stopped. FIG. 6 shows a state immediately after the exposure operation is thus finished.

Next, a setting operation of the embodiment will be described. When a predetermined time has passed since entering the state in FIG. 6, an unshown member of the camera body presses the pressed portion 14d of the setting member 14 upward to rotate the setting member 14 counterclockwise against the biasing force of the unshown return spring. Thus, the pressing portion 14b of the setting member 14 first presses the roller 6d mounted to the front blade driving member 6 to start rotating the front blade driving member 6 clockwise against elasticity of the unshown front blade driving spring, and then the pressing portion 14c presses the pressed portion 10d of the rear blade driving member 10 to start rotating the rear blade driving member 10 clockwise against the biasing force of the unshown rear blade driving spring. The driving pins 6b and 10b of the driving members 6 and 10 thus rotate the arms 15 and 21 clockwise. Thus, the four blades 17 to 20 of the front blade are moved downward with a decreasing amount of mutual overlapping of the adjacent blades, and the four blades 23 to 26 of the rear blade are moved downward with an increasing amount of mutual overlapping of the adjacent blades.

Then, the four blades 17 to 20 of the front blade are spread to finish covering the aperture 1a, and immediately thereafter, the iron scrap portions 8b and 12b of the iron scrap members 8 and 12 are successively brought into contact with the iron core members 4 and 5. At the moment of the contact, the sucked surfaces of the iron scrap portions 8b and 12b are not in parallel with the sucking surfaces of the iron core members 4 and 5, but tilted in any direction. However, as the iron scrap portions 8b and 12b are then pressed into the accommodation chamber against the biasing forces of the compression springs 9 and 13, and the flanges 8c and 12c are moved away from the mounting portions 6c and 10c, the sucked surfaces of the iron scrap portions 8b and 12b become parallel to the sucking surfaces of the iron core members 4 and 5. After the sucked surfaces of the iron scrap portions 8b and 12b are brought into tight contact with the sucking surfaces of the iron core members 4 and 5, pressing of the unshown member of the camera body is stopped, and thus the setting member 14 stops rotation, and remains in the position until the next photography. FIG. 7 shows a state where the setting operation thus performed is finished.

As described above, from the moment when part of the iron scrap portions 8b and 12b of the iron scrap members 8 and 12 are brought into contact with the iron core members 4 and 5, the shafts 8a and 12a are tilted, and in this embodiment, the tilt starting operation is smoothly performed. This will be described with reference to FIGS. 2, 3, 8 and 9. FIGS. 2 and 3 show a state where the sucked surface of the iron scrap portion 8b is not tilted at all, that is, a state where the shaft 8a is not tilted at all even when the iron scrap portion 8b of the iron scrap member 8 is brought into contact with the iron core member 4 of the front blade electromagnet in a final stage of the setting operation.

First, a conventional configuration will be described. In the conventional configuration, a collar member 7 is not provided unlike this embodiment, and in such a state, a flange 8c is directly brought into contact with a mounting portion 6c. In the conventional configuration, in the case where part of a sucked surface of an iron scrap portion 8b is brought into contact with an iron core member 4 to tilt the a shaft 8a in any direction, and when the shaft 8a is laterally tilted along the sheet surface of FIG. 2, the flange 8c swings along an arcuate surface of an edge of a mounting hole and thus the shaft 8a is smoothly tilted. On the other hand, when the shaft 8a is tilted perpendicularly to the sheet surface of FIG. 2, an outer peripheral portion in a moving direction of the flange 8c engages the arcuate surface of the edge of the mounting hole, which prevents a smooth start of the tilt of the shaft 8a, and damages part of the arcuate surface.

On the other hand, in the embodiment, the collar member 7 having a special shape is provided as described above. Thus, such a problem does not occur.

Specifically, according to the configuration of the embodiment, when part of the sucked surface of the iron scrap portion 8b is brought into contact with the iron core member 4, and the shaft 8a is tilted so that the flange 8c laterally swings along the sheet surface of FIG. 2, the shaft 8a presses an edge in a widthwise direction of the hole 7a of the collar member 7, and the flange 8c swings together with the collar member 7 along the arcuate surface of the mounting portion 6c in contact with the collar member 7, and the tilt of the shaft 8a is smoothly started. FIG. 8A shows a state where the shaft 8a is tilted counterclockwise by a predetermined angle 61 from the state in FIG. 2, and FIG. 8B shows a state where the shaft 8a is tilted clockwise by a predetermined angle 62 from the state in FIG. 2.

When the shaft 8a is tilted so that the flange 8c swings perpendicularly to the sheet surface of FIG. 2, that is, vertically to the sheet surface of FIG. 3, the shaft 8a is moved longitudinally in the hole 7a of the collar member 7, and the flange 8c thus swings along the arcuate surface formed in the arcuate portion 7b of the collar member 7, thereby allowing the tilt of the shaft 8a to be smoothly started. FIG. 9A shows a state where the shaft 8a is tilted counterclockwise by a predetermined angle 03 from the state in FIG. 3, and FIG. 9B shows a state where the shaft 8a is tilted clockwise by a predetermined angle 04 from the state in FIG. 3.

Figure 10A:
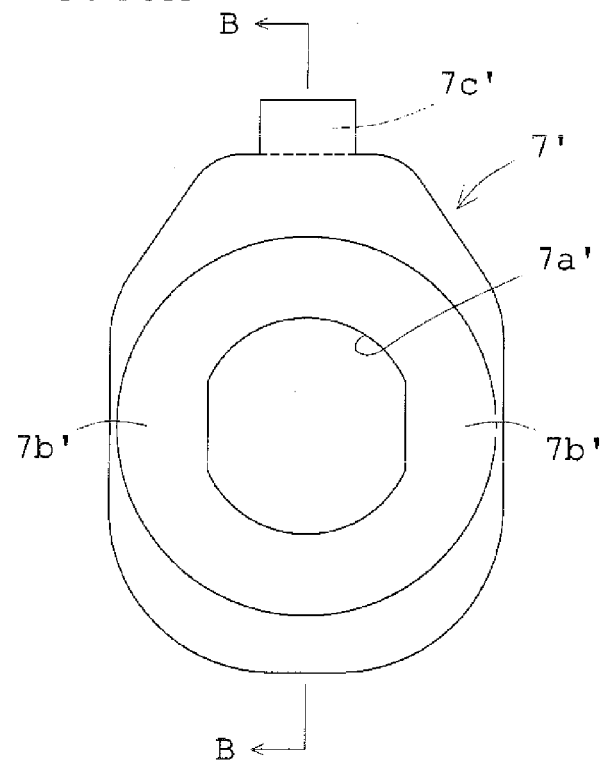
FIGS. 10A and 10b are a plan view and a sectional view taken along the line B-B of a variation of the collar member in FIG. 4.
Figure 10B:
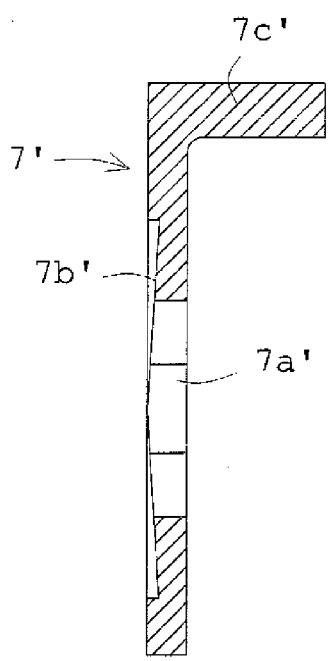

In the embodiment, the collar member 7 is made of metal, but may be made of synthetic resin. FIG. 10 shows a variation in such a case, and FIG. 10A is a plan view thereof and FIG. 10b is a sectional view taken along the line B-B in FIG. 10A. As shown in FIG. 10A, a collar member 7' of the variation has a hole 7'a having the same shape as the hole 7a substantially in the center, and a bent portion 7'c above the hole 7'a. As is apparent from FIG. 10B, the collar member 7' is generally thicker than the collar member 7 of the embodiment for obtaining predetermined strength. Thus, in the variation, arcuate portions 7'b and 7'b are formed in a circular recess.

Figure 11:
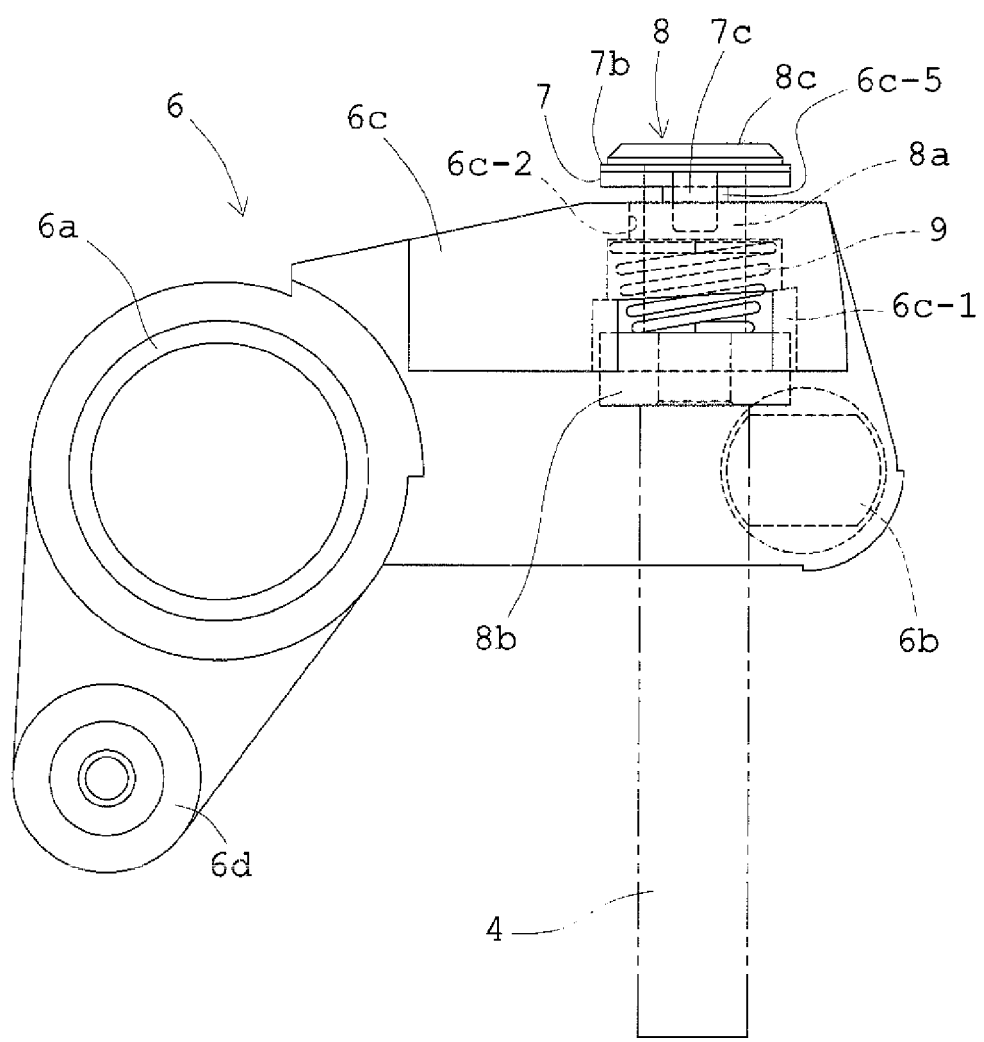
FIG. 11 is a plan view of a variation of the front blade driving member in FIG. 2 showing in the same manner as FIG. 2.
Figure 12:
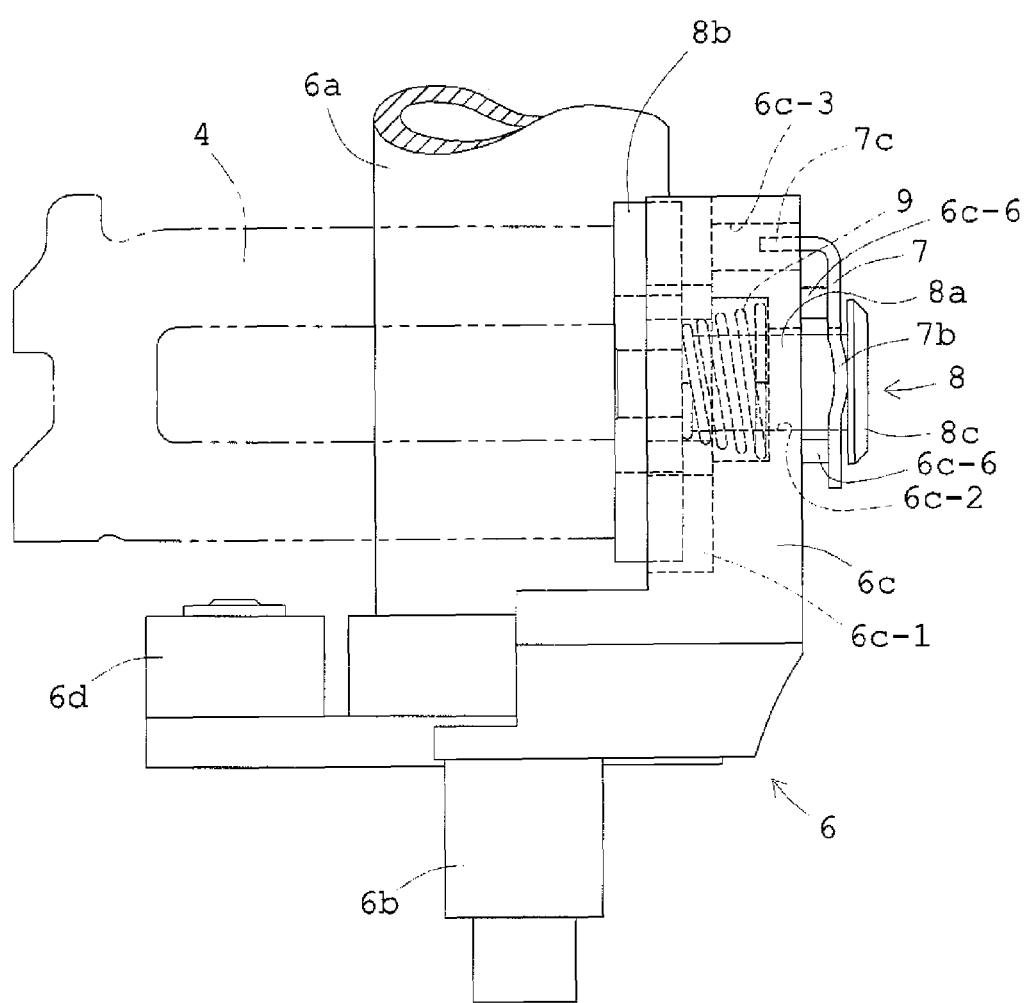
FIG. 12 is a side view, partially omitted, of the front blade driving member viewed from the right in FIG. 11.

In the embodiment, the collar member 7 is brought into contact with the arcuate surface 6c-4 formed on the mounting portion 6c of the front blade driving member 6. Instead of forming the arcuate surface 6c-4, two protrusions may be provided in positions corresponding to the top of the arcuate surface 6c-4 on the mounting portion 6c with the hole 6c-2 therebetween so that the collar member 7 is brought into contact with the protrusions, thereby obtaining the same advantages. FIGS. 11 and 12 show a variation thus configured, FIG. 11 is a plan view showing in the same manner as FIG. 2, and FIG. 12 is a side view showing in the same manner as FIG. 3.

As is apparent from FIG. 12, in the variation, two protrusions 6c-5 and 6c-6 are formed integrally with a mounting portion 6c with a hole 6c-2 therebetween. Thus, also in the variation, the shaft 8a can be smoothly tilted along the sheet surface of FIG. 11.

After the setting operation is thus suitably performed and when a release button of the camera is pressed for the next photography, the coil of the front blade electromagnet and the coil of the rear blade electromagnet that are not shown are first energized, and the iron scrap members 8 and 12 in tight contact with the iron core members 4 and 5 are sucked and held. Then, in the state in FIG. 7, the unshown member of the camera body is moved downward away from the pressed portion 14d. Thus, the setting member 14 is rotated clockwise toward the initial position by elasticity of the unshown return spring. During the rotation of the setting member 14, when the pressing portion 14b is moved away from the roller 6d of the front blade driving member 6, and the pressing portion 14c is moved away from the pressed portion 10d of the rear blade driving member 10, the driving members 6 and 10 are slightly rotated counterclockwise from the state in FIG. 7 by biasing forces of the unshown driving springs and stopped. Specifically, the driving members 6 and 10 are rotated counterclockwise by the biasing forces of the unshown driving springs by the amount of separation between flanges 8c and 12c of the iron scrap members 8 and 12 and the collar members 7 and 11 in the set state. Then, the setting member 14 continues clockwise rotation and returns to the initial position. This state is as shown in FIG. 1.

As described above, no problem occurs in the configuration of the embodiment unlike the conventional configuration when the setting member 14 returns to the initial position and the driving members 6 and 10 are slightly rotated counterclockwise from the state in FIG. 7 to the state in FIG. 1 by the biasing forces of the unshown driving springs. This will be described with the front blade driving member 6 in the state in FIG. 7. In the embodiment, in the state in FIG. 7, the iron scrap portion 8b of the iron scrap member 8 is pressed into the accommodation chamber against the biasing force of the compression spring 9, and part of the shaft 8a is exposed above the mounting portion 6c. In the conventional configuration, as shown in FIG. 8 of Japanese Patent Laid-Open No. 9-304808, the state is similar to that in FIG. 7 merely without the collar member 7 in the embodiment.

Thus, the conventional configuration will be first described. As described above, in the state in FIG. 7, it is uncertain in which direction the shaft 8a of the iron scrap member 8 is tilted. If the shaft 8a is tilted so that the flange 8c swings along the sheet surface of FIG. 7, the arcuate surface formed on the mounting portion 6c is brought into line contact with the surface of the flange 8c even if the front blade driving member 6 is rotated to the state in FIG. 1, and thus no problem occurs. However, when the shaft 8a is tilted so that the flange 8c swings perpendicularly to the sheet surface of FIG. 7, part of the arcuate surface of the mounting portion 6c abuts the outer peripheral portion of the flange 8c in the swing direction, and part of the arcuate surface in abutment is damaged in each photography. The exposure operation start position of the front blade driving member 6 is gradually displaced, which prevents a stable exposure time from being obtained.

On the other hand, in the embodiment, the collar member 7 having the special shape is provided as described above, and such a problem does not occur. Specifically, according to the configuration of the embodiment, even if the shaft 8a is tilted so that the flange 8c swings along the sheet surface of FIG. 7, or the flange 8c swings perpendicularly to the sheet surface of FIG. 7, the front blade driving member 6 is rotated to the state in FIG. 1, and the arcuate surface of the mounting portion 6c merely presses the collar member 7 and does not abut the outer periphery of the flange 8c of the iron scrap member 8, thereby preventing the risk of damage to the arcuate surface by the flange 8c. This allows a stable exposure time to be always obtained.

The embodiment of the invention is configured as a focal plane shutter including two shutter blades (a front blade and a rear blade) that can be adopted in silver film cameras and digital cameras. However, among the components of the embodiment, the front blade constituted by the arms 15 and 16 and the blades 17, 18, 19 and 20, the front blade driving member 6, and the front blade electromagnet (the iron core member 4) can be removed to configure a focal plane shutter including one shutter blade that can be adopted to only digital cameras. Embodiment 2

Figure 13:
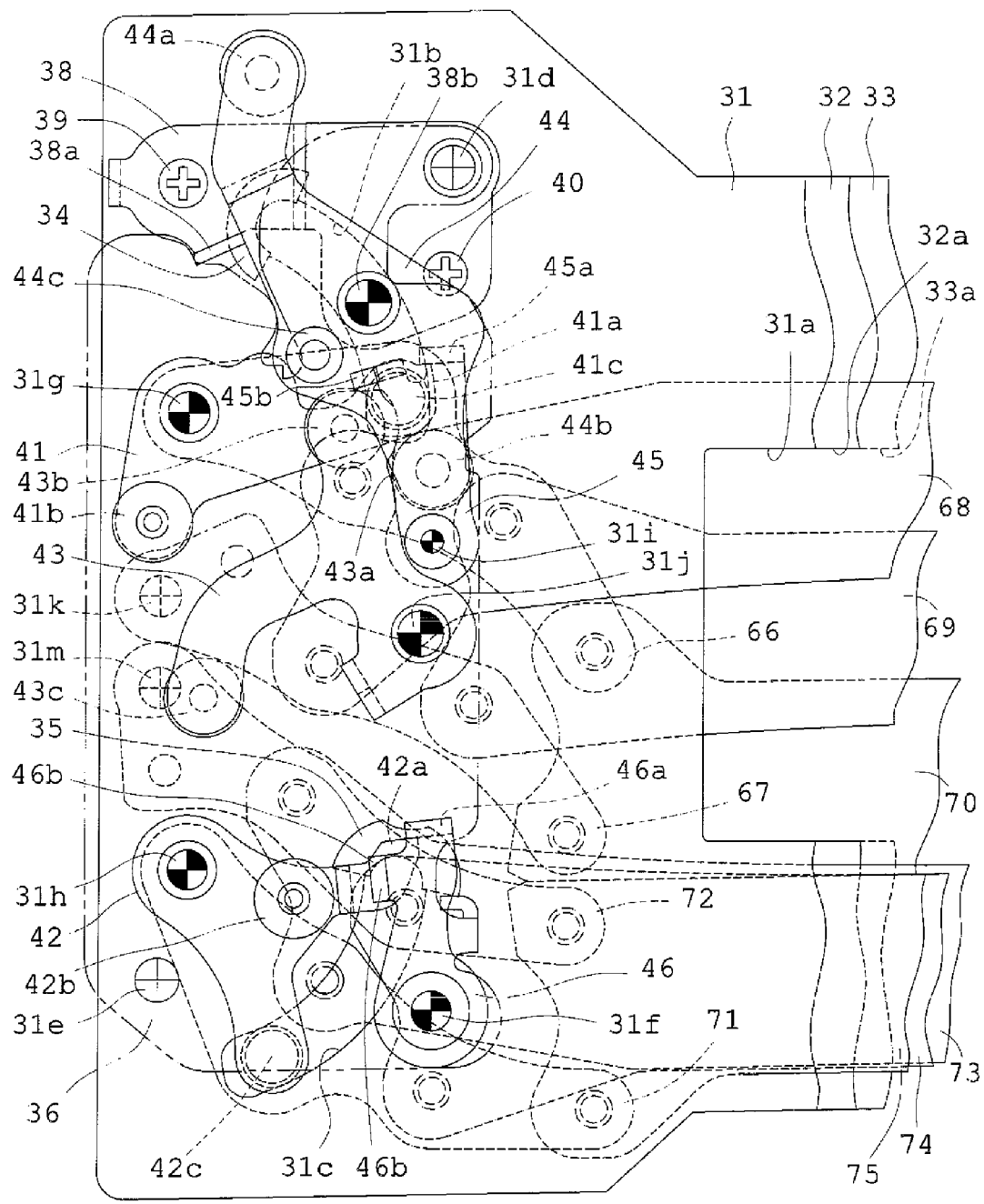
FIG. 13 is a plan view of Embodiment 2 showing an opening and closing driving mechanism in a set state.
Figure 15:
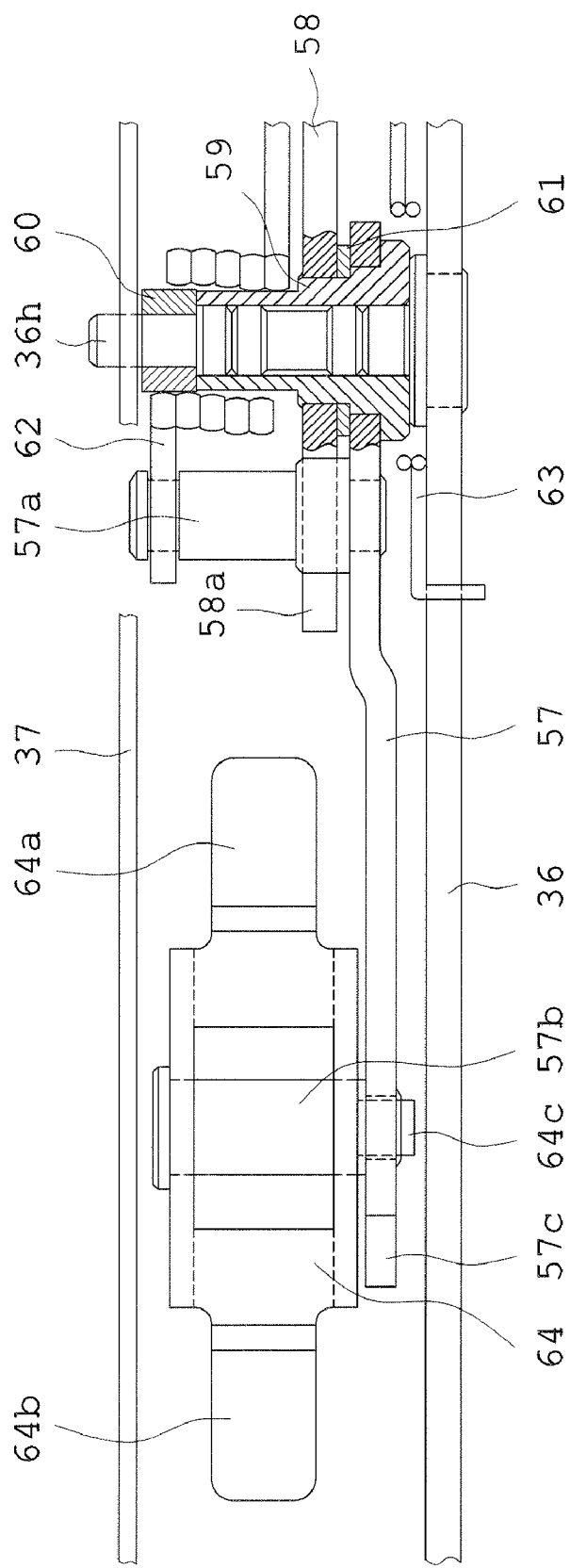
FIG. 15 is a side view, partially enlarged, of the lock releasing mechanism in FIG. 14.
Figure 16:
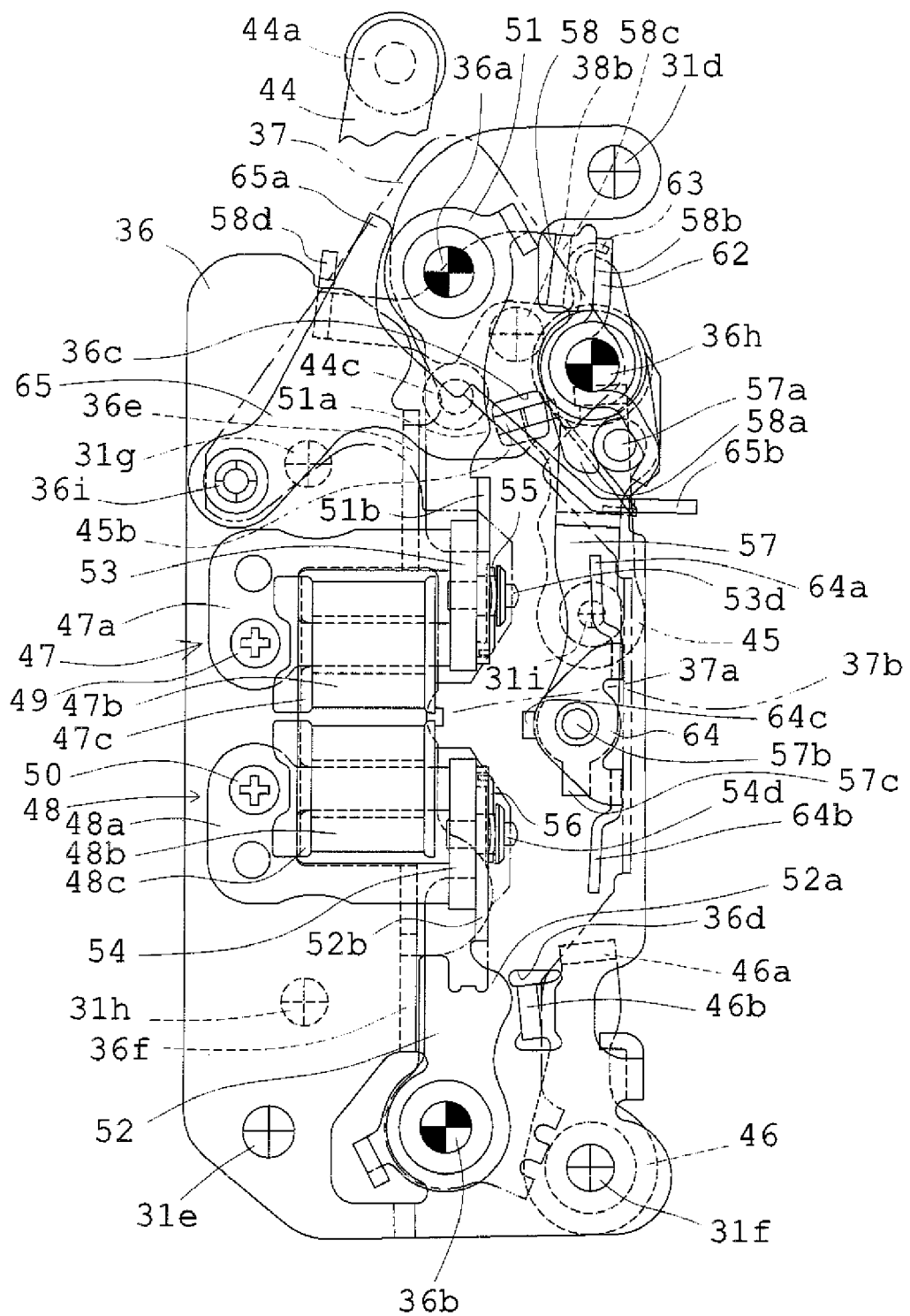
FIG. 16 is a plan view of Embodiment 2 showing in the same manner as FIG. 14, and shows a state where a holding force of a holding member for holding two releasing members is released from the state in FIG. 14.
Figure 17:
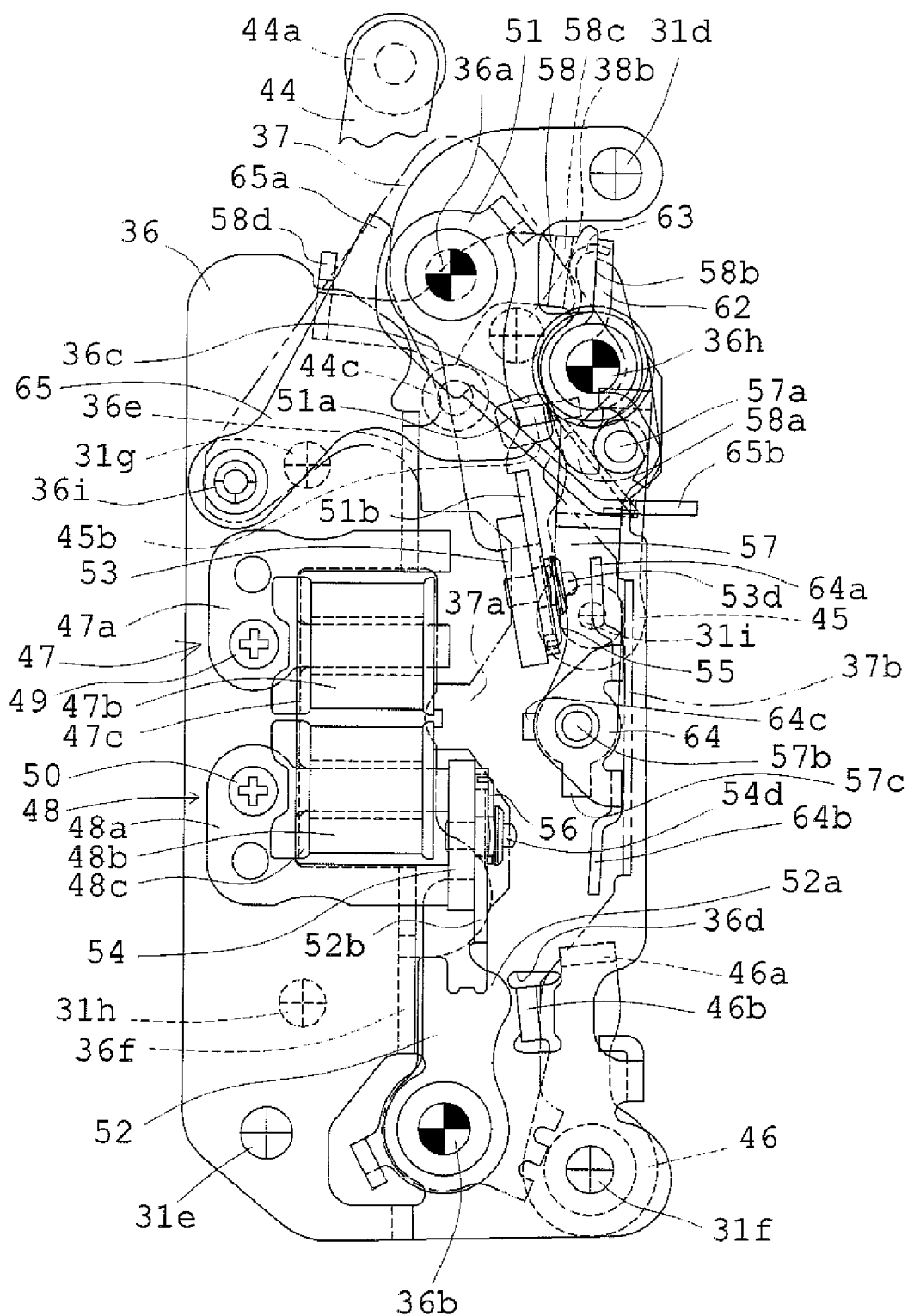
FIG. 17 is a plan view of Embodiment 2 showing in the same manner as FIG. 14, and shows a state where a lock of the front blade driving member is released from the state in FIG. 16.
Figure 18:
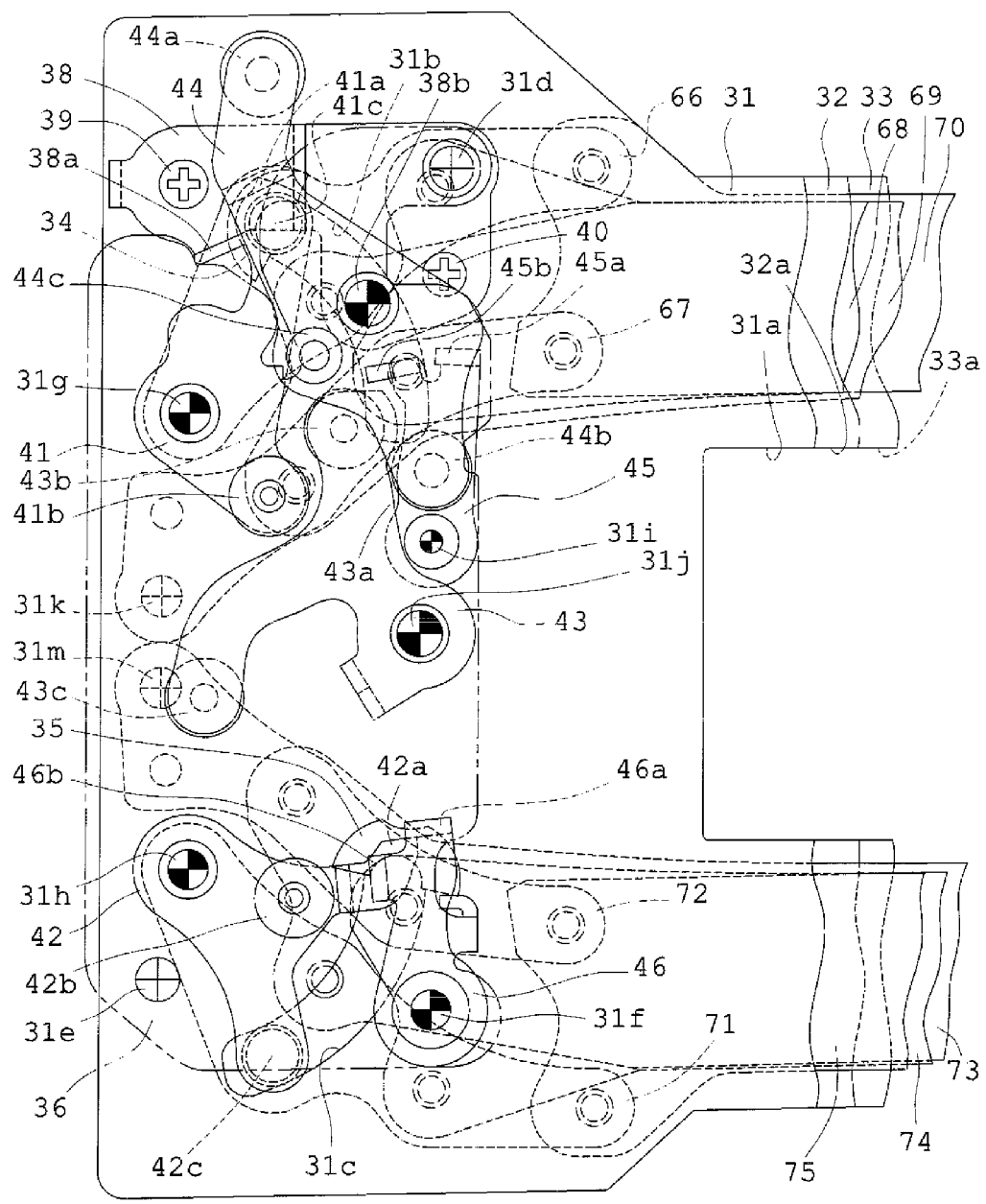
FIG. 18 is a plan view of Embodiment 2 showing in the same manner as FIG. 13, and shows a state where an opening operation of a front blade is completed.
Figure 19:
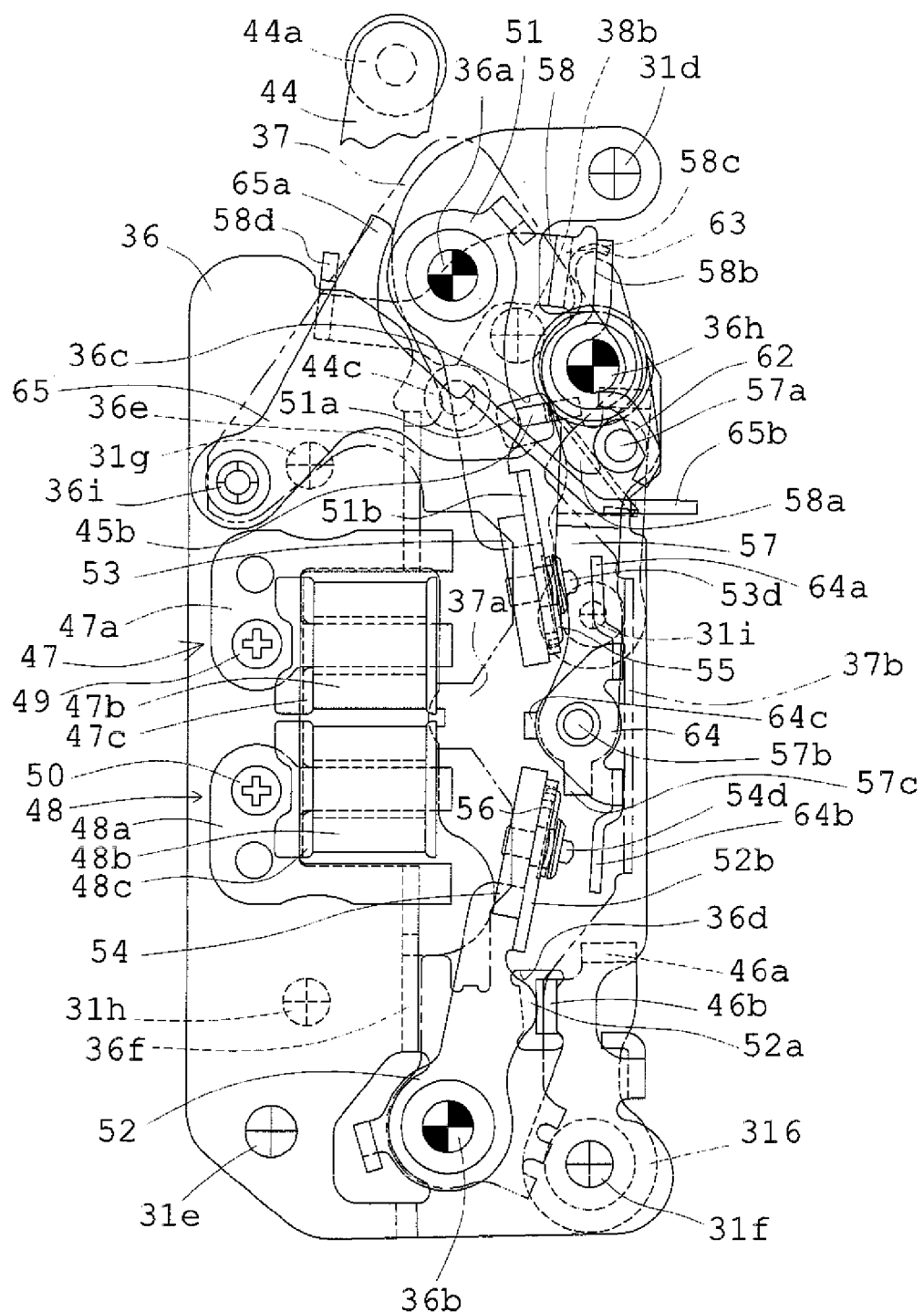
FIG. 19 is a plan view of Embodiment 2 showing in the same manner as FIG. 14, and shows a state where a lock of a rear blade driving member is released from the state in FIG. 17.
Figure 20:
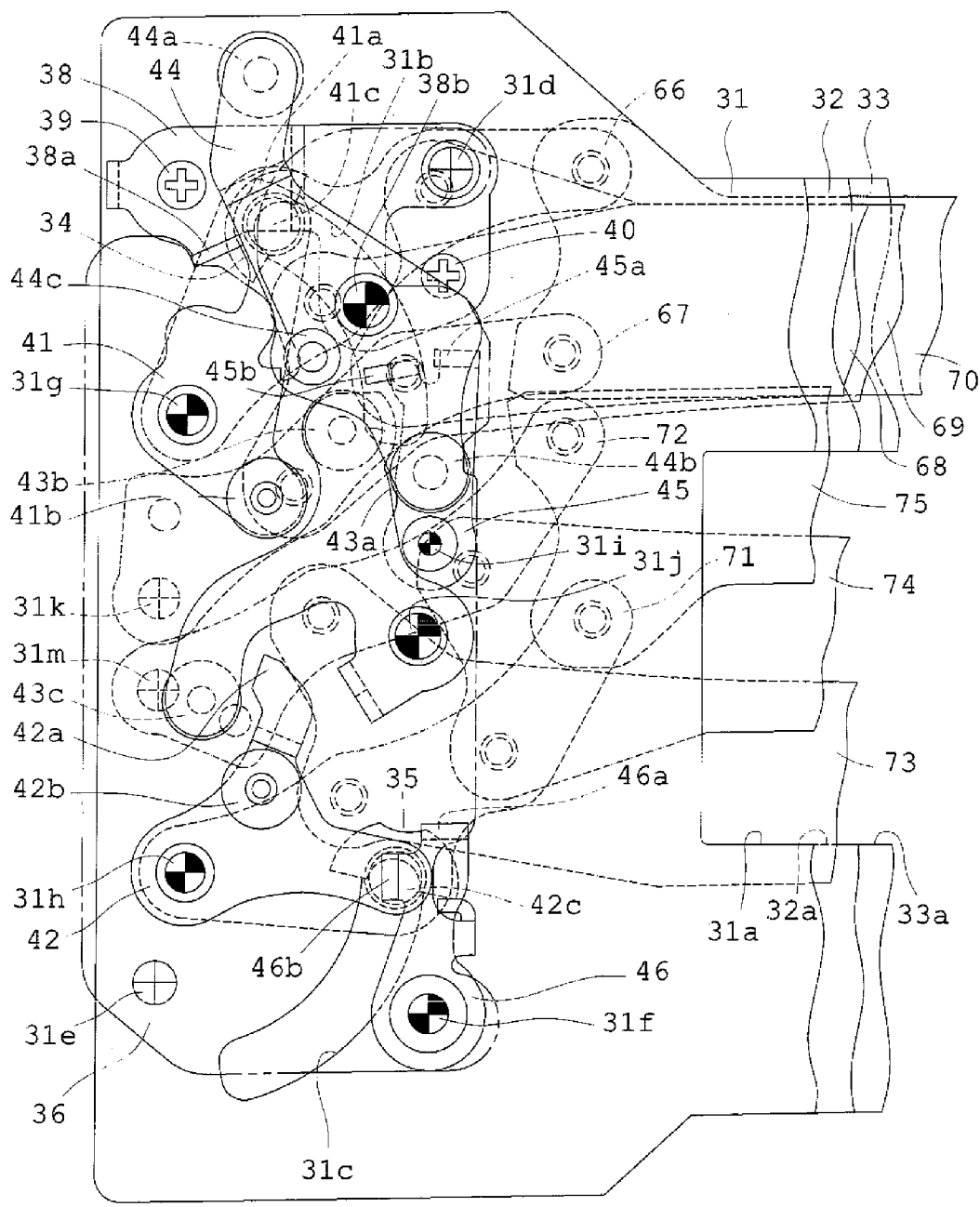
FIG. 20 is a plan view of Embodiment 2 showing in the same manner as FIG. 13, and shows a state where a closing operation of a rear blade is completed.
Figure 21:
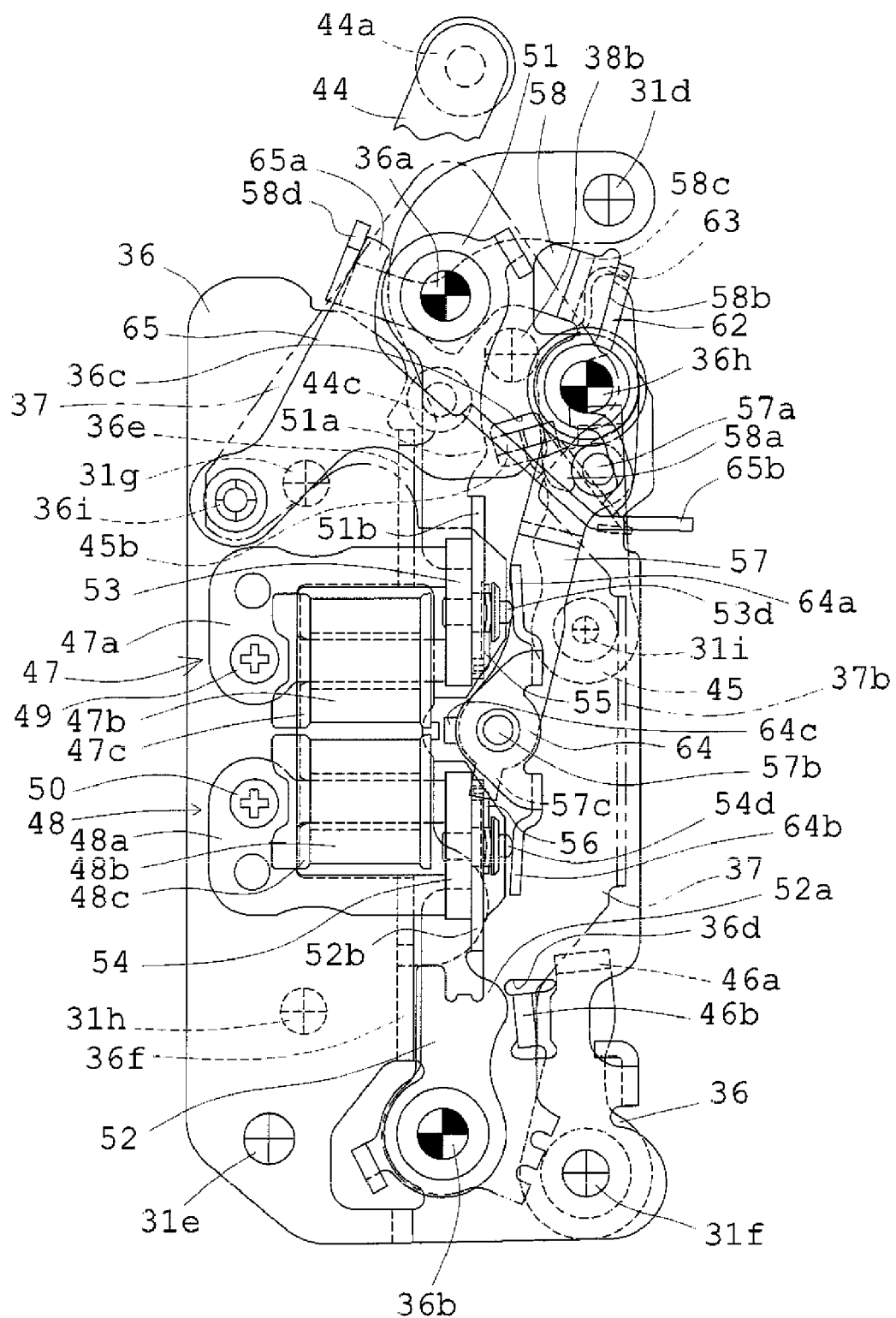
FIG. 21 is a plan view of Embodiment 2 showing in the same manner as FIG. 14, and shows a state immediately after a setting operation is started after the state in FIG. 20.
Figure 22:
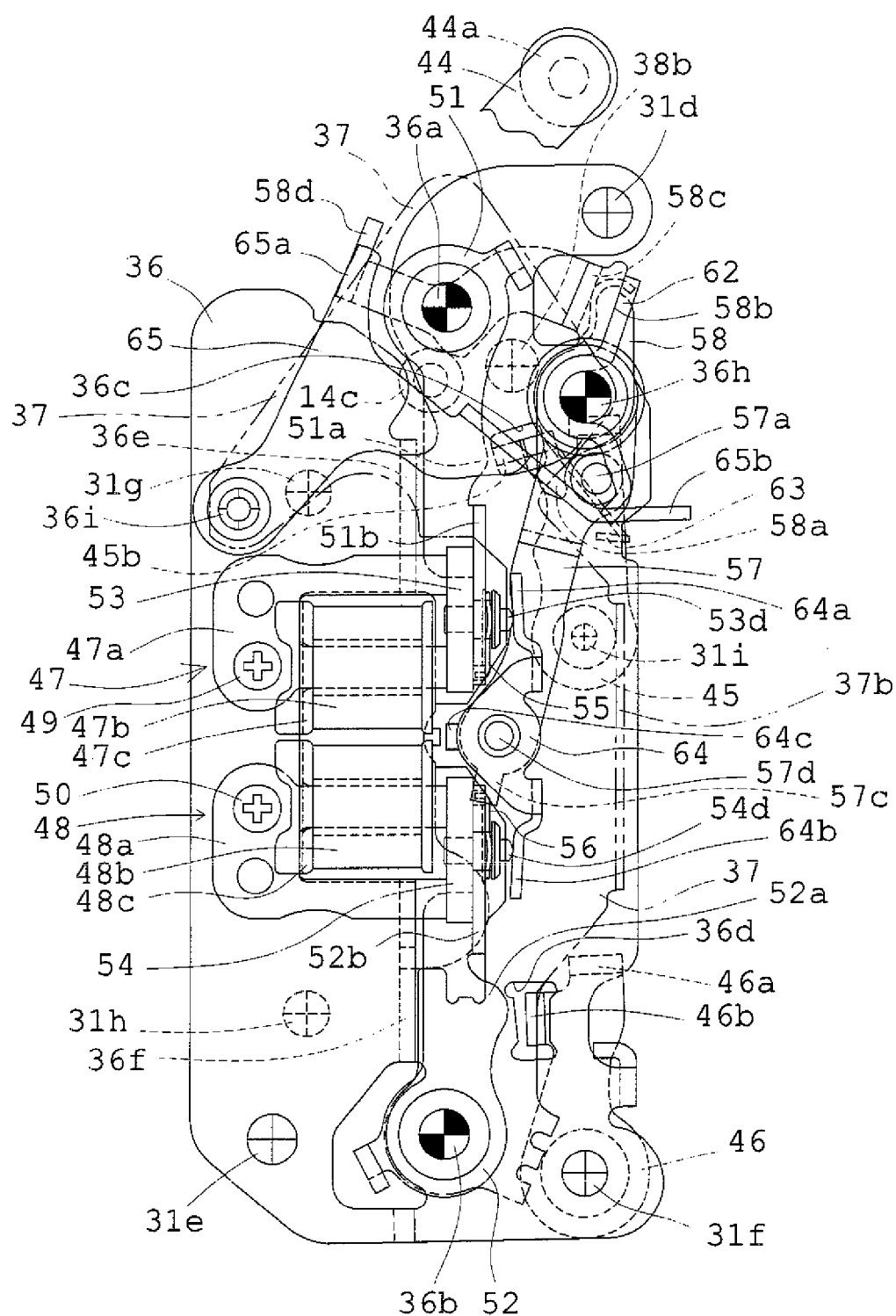
FIG. 22 is a plan view of Embodiment 2 showing in the same manner as FIG. 14, and shows a state where the holding member is locked in a holding state of two releasing members after the state in FIG. 21.
Figure 23:
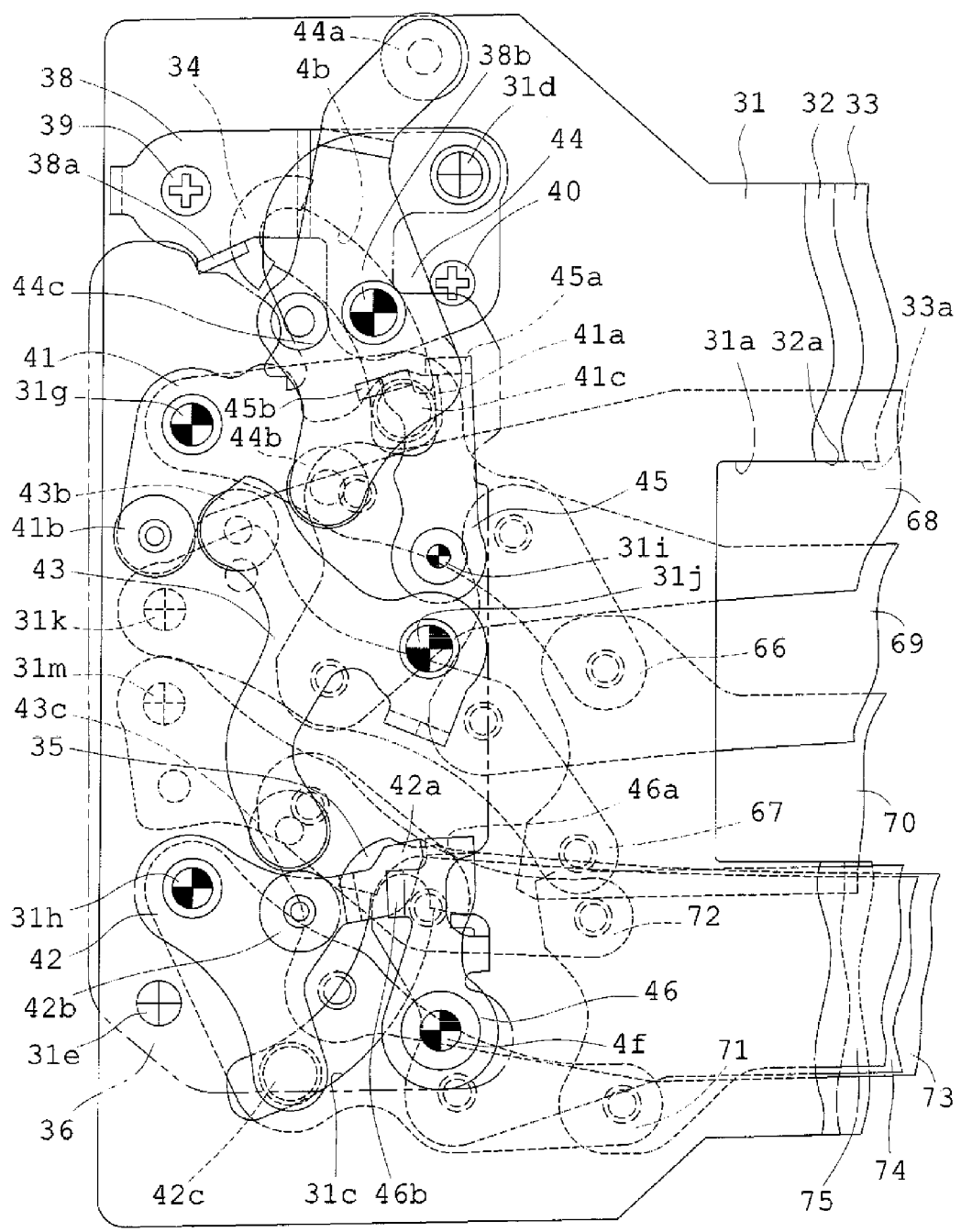
FIG. 23 is a plan view of Embodiment 2 showing in the same manner as FIG. 13, and shows a state where the front blade and the rear blade are operated to be set from the state in FIG. 20, and the front blade driving member can be locked by the front blade locking member.
Figure 24:
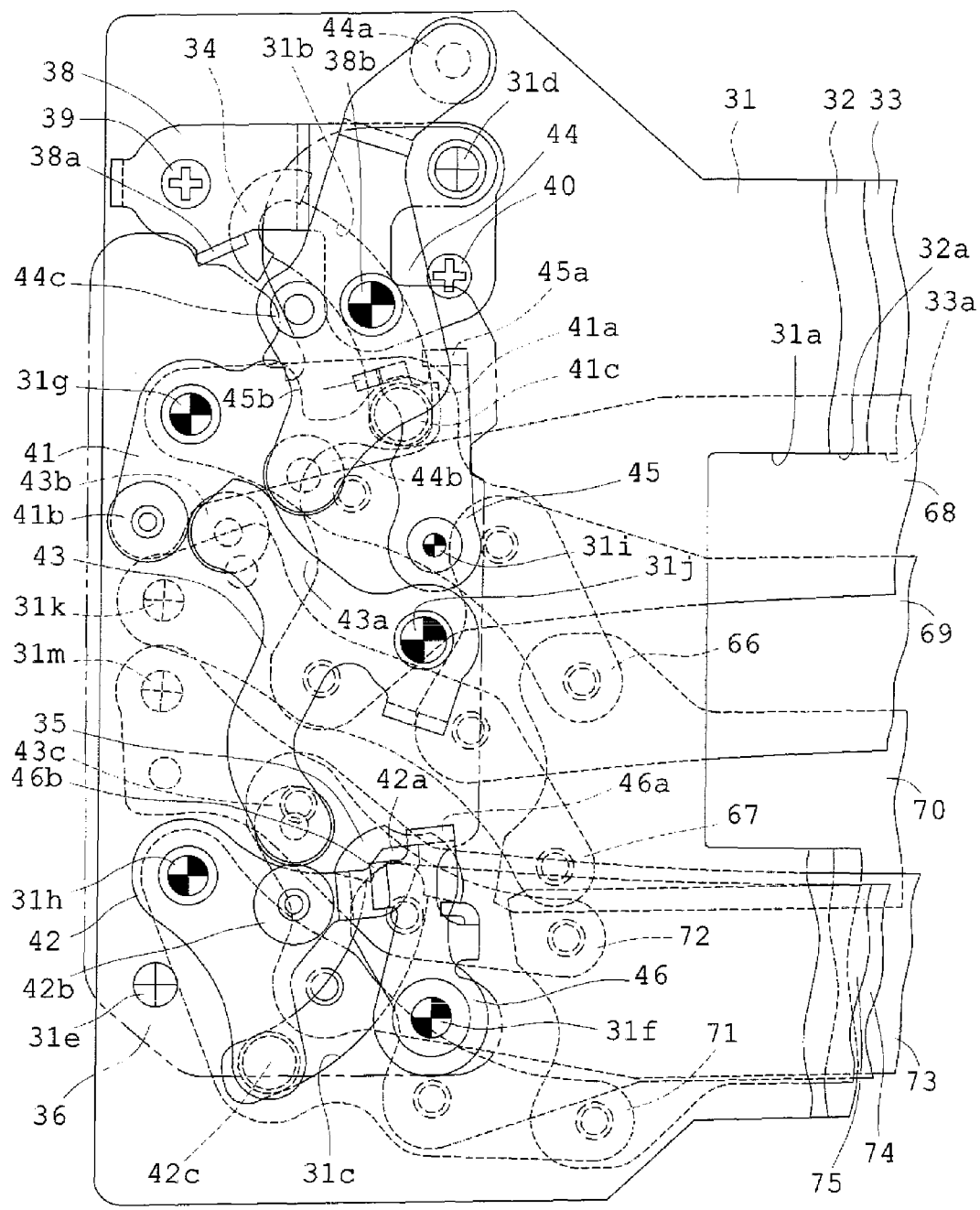
FIG. 24 is a plan view of Embodiment 2 showing in the same manner as FIG. 13, and shows a state where the rear blade driving member can be locked by a rear blade locking member after the state in FIG. 23.

Next, Embodiment 2 of the present invention will be described with reference to FIGS. 13 to 26. FIG. 13 is a plan view showing an opening and closing driving mechanism in a set state, FIG. 14 is a plan view showing a lock releasing mechanism in the set state, and FIG. 15 is a side view, partially enlarged, of the lock releasing mechanism in FIG. 14. FIG. 16 shows a state where a holding force of a holding member for holding two releasing members is released from the state in FIG. 14, FIG. 17 shows a state where a lock of the front blade driving member is released from the state in FIG. 16, and FIG. 18 shows a state where an opening operation of a front blade is completed. FIG. 19 shows a state where a lock of a rear blade driving member is released from the state in FIG. 17, and FIG. 20 shows a state where a closing operation of a rear blade is completed. FIG. 21 shows a state immediately after a setting operation is started after the state in FIG. 20, and FIG. 22 shows a state where the holding member is locked in a holding state of the two releasing members after the state in FIG. 21. FIG. 23 shows a state where the front blade driving member can be locked by the front blade locking member, and FIG. 24 shows a state where the rear blade driving member can be locked by a rear blade locking member after the state in FIG. 23. FIG. 25 is a plan view showing a state where a shaft of an iron scrap member mounted to a front blade releasing member is tilted, and FIG. 25A shows a state of a counterclockwise tilt in the state in FIG. 14 and FIG. 25B shows a state of a clockwise tilt in the state in FIG. 14. FIG. 26 shows a state where the shaft of the iron scrap member mounted to the front blade releasing member is tilted viewed from below in FIG. 14, and FIG. 26A shows a state of a counterclockwise tilt and FIG. 26b shows a clockwise tilt.

First, a configuration of this embodiment will be described. FIGS. 13 and 14 are plan views of a set state (a photography standby state) of the embodiment viewed from a subject side. FIG. 13 shows substantially the left half of a focal plane shutter of the embodiment for mainly illustrating the opening and closing mechanism of the shutter blade, and FIG. 14 mainly shows a lock releasing mechanism of the opening and closing mechanism. The components in FIG. 14 are actually placed in a stacked manner on the subject side of the opening and closing mechanism in FIG. 13, but the drawings are less visible shown in such a manner, and thus shown divided into two parts. Thus, for the sake of clarity of the arrangement and interlock of both the mechanisms, components in one mechanism are partly shown in the other drawing.

In FIG. 13, a shutter base plate 31 has, substantially in the center thereof, an aperture 31a for a photography optical path having a horizontally oriented rectangular shape. On a back side of the shutter base plate 31, an intermediate plate 32 and an auxiliary base plate 33 are mounted in the order at a predetermined distance therebetween, and a blade chamber of the rear blade described later is formed between the shutter base plate 31 and the intermediate plate 32, and a blade chamber of the front blade described later is formed between the intermediate plate 32 and the auxiliary base plate 33. The intermediate plate 32 and the auxiliary base plate 33 have apertures 32a and 33a having the same shape as the aperture 31a in positions overlapping the aperture 31a, and an exposure aperture is controlled by the aperture 31a. Two arcuate slots 31b and 31c are formed on the left of the aperture 31a. At upper ends of the slots 31b and 31c, shock absorbing members 34 and 35 are mounted made of rubber and having a substantially C-shaped plane.

The subject side of the shutter base plate 31 is formed to have two steps, and a middle step is partly formed between a first step and a second step. Specifically, to the shafts 31d, 31e and 31f standing on the subject side of the shutter base plate 31, an upper base plate 36 is mounted at a predetermined distance from the shutter base plate 31. For the upper base plate 36, FIG. 13 shows a contour thereof by a dash-double-dot line, and FIG. 14 shows an actual shape by a solid line. A shown in FIG. 14, to shafts 36a and 36b standing on the subject side of the upper base plate 36, a cover plate 37 is mounted in parallel with the upper base plate 36 at a predetermined distance. The cover plate 37 is shown by a dash-double-dot line in FIG. 14. Further, unshown two shafts stand on the subject side of the shutter base plate 31, and a shelf plate 38 having a small area is mounted by two screws 39 and 40 to top surfaces of the shafts at a predetermined distance from the shutter base plate 31 and the upper base plate 36 as shown in FIG. 13. The shelf plate 38 has a bent portion 38a bent toward the upper base plate 36, and a shaft 38b standing thereon.

On the subject side of the shutter base plate 31, shafts 31g, 31h, 31i and 31j as well as the shaft 31d, 31e and 31f stand as shown in FIG. 13. The shafts 31g and 31h pass through the shutter base plate 31 so that the shutter base plate 31 also has shaft portions on the back side. On the back side of the shutter base plate 31, shafts 31k and 31m stand as well as the shaft portions of the shafts 31g and 31h.

On the subject side of the shutter base plate 31, a front blade driving member 41 is rotatably mounted to the shaft 31g, and biased to be rotated counterclockwise by an unshown front blade driving spring, and the rotation causes part of the front blade driving member 41 to be inserted between the shutter base plate 31 and the shelf plate 38. The front blade driving member 41 has a locked portion 41a, a roller 41b rotatably mounted to the subject side, and a driving pin 41c on the back side. The driving pin 41c passes through the slot 31b of the shutter base plate 31 and is connected to the front blade in the blade chamber, and the configuration of the front blade will be described later.

On the subject side of the shutter base plate 31, a rear blade driving member 42 is rotatably mounted to the shaft 31h, and biased to be rotated counterclockwise by an unshown rear blade driving spring. The rear blade driving member 42 has a locked portion 42a, a roller 42b rotatably mounted to the subject side, and a driving pin 42c on the back side. The driving pin 42c passes through the slot 31c of the shutter base plate 31 and is connected to the rear blade in the blade chamber, and the configuration of the rear blade will be described later.

A setting member 43 is rotatably mounted to the shaft 31j of the shutter base plate 31, and biased to be rotated clockwise by an unshown spring. The setting member 43 has a pressed portion 43a, and has, on the side of the shutter base plate 31, a roller 43b that can be brought into contact with the roller 41b of the front blade driving member 41 and a roller 43c that can be brought into contact with the roller 42b of the rear blade driving member 42.

A set operation member 44 is rotatably mounted to the shaft 38b of the shelf plate 38. The set operation member 44 has two rollers 44a and 44b mounted to the side of the shutter base plate 31, and a roller 44c mounted to the side of the upper base plate 36. Torque by a spring is not applied to the set operation member 44 itself. Thus, in FIG. 13, the bent portion 38a of the shelf plate 38 prevents the roller 44b of the set operation member 44 from being pressed by the pressed portion 43a and rotated counterclockwise by a force of a spring biasing the setting member 43. For the set operation member 44, a mounting portion of the roller 44a and the roller 44c only are shown in the plan view such as FIG. 14 showing the lock releasing mechanism for the clarity of the drawings.

A front blade locking member 45 is rotatably mounted to the shaft 31i of the shutter base plate 31, and biased to be rotated counterclockwise by an unshown spring. The front blade locking member 45 has a locking portion 45a bent toward the shutter base plate 31, and in FIG. 13, the locking portion 45a locks the locked portion 41a of the front blade driving member 41, and prevents counterclockwise rotation of the front blade driving member 41. The front blade locking member 45 has a pressed portion 45b further protruding toward the upper base plate 36 on the left of a bent portion bent toward the upper base plate 36. The pressed portion 45b is inserted into an unshown slot formed in the set operation member 44, and inserted into a square hole 36c (see FIG. 14) of the upper base plate 36, and thus placed between the upper base plate 36 and the cover plate 37. A slot formed in the set operation member 44 and into which the pressed portion 45b of the front blade locking member 45 is inserted is not shown, and thus in FIGS. 13, 18, 20, 23 and 24, the pressed portion 45b of the front blade locking member 45 is shown by solid lines.

A rear blade locking member 46 is rotatably mounted to the shaft 31f to which the upper base plate 36 is mounted, and elastically biased to be rotated counterclockwise by an unshown spring. The rear blade locking member 46 has a locking portion 46a bent toward the shutter base plate 31 and a pressed portion 46b bent toward the upper base plate 36. In FIG. 13, the locking portion 46a locks the locked portion 42a of the rear blade driving member 42 and prevents counterclockwise rotation of the rear blade driving member 42. The pressed portion 46b is inserted into a bobbin-shaped hole 36d formed in the upper base plate 36 as shown in FIG. 14, and protrudes from between the upper base plate 36 and the cover plate 37.

As shown in FIG. 14, the upper base plate 36 has two bent portions 36e and 36f formed to be vertically in line. The upper base plate 36 has different levels with the bent portions 36e and 36f as a boundary, and the right side is placed closer to the shutter base plate 31 than the left side. A relatively large aperture, though not denoted by a reference numeral, is formed in a vertically middle region between the bent portion 36e and the bent portion 36f mainly on the left side. Two electromagnets 47 and 48 are mounted to the upper base plate 36 having such a shape by screws 49 and 50. The electromagnets 47 and 48 are constituted by U-shaped iron core members 47a and 48a, and bobbins 47c and 48c around which coils 47b and 48b are wound, and the bobbins 47c and 48c are fitted to one legs of the iron core members 47a and 48a. The bobbins 47c and 48c are inserted, partly on the sides of the upper base plate 36, into the aperture without a reference numeral, and as is apparent from FIG. 16, prevented from being removed from the iron core members 47a and 48a to the right by a preventing portion 37a of the cover plate 37.

A front blade releasing member (mounting member) 51 and a rear blade releasing member (mounting member) 52 are rotatably mounted to the shafts 36a and 36b standing on the upper base plate 36 and to which the cover plate 37 is mounted, the front blade releasing member 51 is biased to be rotated counterclockwise, and the rear blade releasing member 52 is biased to be rotated clockwise, by biasing forces of unshown releasing springs. The front blade releasing member 51 has a pressing portion 51a and a bent portion 51b, and an iron scrap member 53 and a collar member 55 are mounted to the bent portion 51b. The rear blade releasing member 52 has a pressing portion 52a and a bent portion 52b, and an iron scrap member 54 and a collar member 56 are mounted to the bent portion 52b. The iron scrap member 54 and the collar member 56 are mounted to the bent portion 52b substantially in the same manner as the iron scrap member 53 and the collar member 55 mounted to the bent portion 51b. Thus, a mounting configuration of the iron scrap member 53 and the collar member 55 to the bent portion 51b will be described in detail with reference to FIGS. 25A and 26A. FIG. 25A is a plan view of the mounting configuration of the iron scrap member 53 and the collar member 55 to the bent portion 51b from the subject side like FIG. 14, and FIG. 26A is a sectional view from below in FIG. 14.

The front blade releasing member 51 of the embodiment is made of metal, and as is apparent from FIG. 26A, the bent portion 51b has a mounting hole 51b-1, and a recess in a surface opposite to the iron core member 47a, in which an arcuate surface 51b-2 is formed. The arcuate surface 51b-2 is formed so that a ridge on two tops with the mounting hole 51b-1 therebetween is parallel to the shutter base plate 31. As is apparent from FIG. 25A, the bent portion 51b also has a hole 51b-3. Thus, a collar member 55 of the embodiment will be first described. The collar member 55 is made of metal, has substantially the same shape as the collar member 7 in FIG. 4, and has a hole 55a having the same shape as the hole 7a of collar member 7 substantially in the center as shown in FIG. 26A. The collar member 55 has arcuate portions 55a and 55b on opposite sides of the hole 55a. As shown in FIG. 25A, the collar member 55 has a bent portion 55c at a lower end, and the bent portion 55c is loosely inserted into the hole 51b-3 provided in the bent portion 51b of the front blade releasing member 51. Thus, in the state where the collar member 55 is mounted to the bent portion 51b of the front blade releasing member 51, a ridge on tops of arcuate surfaces of the arcuate portions 55b and 55b are perpendicular to the ridge on the top of the arcuate surface 51b-2 formed in the bent portion 51b of the front blade releasing member 51.

Next, the iron scrap member 53 of the embodiment will be described. The iron scrap member 53 of the embodiment includes a shaft 53a that fits in the mounting hole 51b-1 of the bent portion 51b and the hole 55a of the collar member 55a, an iron scrap portion 53b mounted to one end of the shaft 53a, a flange 53c formed on the other end of the shaft 53a, and a pressed portion 53d protruding from the center of the flange 53a. In a state where the iron scrap member 53 and the collar member 55 are mounted to the bent portion 51b of the front blade releasing member 51, the shaft 53a of the iron scrap member 53 is loosely fitted in the mounting hole 51b-1 of the bent portion 51b, and the shaft 53a is tiltable with respect to the mounting hole 51b-1 and also axially slightly movable. Though not shown in detail, a rotation stop portion is actually provided in the bent portion 51b for preventing a large rotation of the shaft 53a. In this embodiment, the iron scrap member 53 is mounted to the bent portion 51b without a spring therebetween. However, a compression spring may be provided between the iron scrap portion 53b of the iron scrap member 53 and the bent portion 51b.

As described above, descriptions on the mounting configuration of the iron scrap member 54 and the collar member 56 to the rear blade releasing member 52 are omitted. In FIGS. 14, 16, 17, 19, 21, and 22, a pressed portion provided on the iron scrap member 54, and corresponding to the pressed portion 53d of the iron scrap member 53 is denoted by reference numeral 54d.

In FIG. 14, a shaft 36h stands on the upper base plate 36, to which a holding member 57 and a holding auxiliary member 58 are rotatably mounted from the side of the upper base plate 36, and the mounting configuration thereof will be described with reference to FIGS. 14 and 15. As shown in FIG. 15, a tubular shaft member 59 and a cylindrical member 60 are rotatably mounted to the shaft 36h of the upper base plate 36. The cylindrical member 60 may be secured by press fitting or other appropriate manner. To the tubular shaft member 59, the holding auxiliary member 58 is secured, while the holding member 57 is rotatably mounted with a washer 61 between the holding member 57 and the holding auxiliary member 58. However, to the tubular shaft member 59, the holding member 57 may be secured, and the holding auxiliary member 58 may be rotatably mounted.

A connecting spring 62 extends between the holding member 57 and the holding auxiliary member 58, and is biased to rotate the holding member 57 clockwise and the holding auxiliary member 58 counterclockwise in FIG. 14. The connecting spring 62 is a torsion coil spring and fitted so that a coil portion can be brought into contact with both the tubular shaft member 59 and the cylindrical member 60, and one arm portion is placed on a shaft 57a of the holding member 57, and the other arm portion is placed on a bent portion 58b (see FIG. 14) of the holding auxiliary member 58. A biasing force of the connecting spring 62 for relatively rotating the holding member 57 and the holding auxiliary member 58 is lost by an abutment portion 58a of the holding auxiliary member 58 abutting a large diameter portion of the shaft 57a of the holding member 57.

As shown in FIG. 15, the holding member 57 is elastically biased to be rotated counterclockwise in FIG. 14 by a separating spring 63 loosely fitted around the tubular shaft member 59. The separating spring 63 may be directly connected to the holding member 57, but is not in this embodiment. Specifically, the separating spring 63 is a torsion coil spring, and in the embodiment, one arm portion is placed on an edge of the upper base plate 36 and the other arm portion is placed on a bent portion 58c (see FIG. 14) of the holding auxiliary member 58. Thus, the holding member 57 is rotated counterclockwise in FIG. 14 by the abutment portion 58a of the holding auxiliary member 58 elastically biased by the separating spring 63 pressing the shaft 57a. On the other hand, the holding auxiliary member 58 is placed, at a tip side from the bent portion 58c, on the back side of the upper base plate 36 as shown in FIG. 14, and the bent portion is provided at a tip on the left of the upper base plate 36, part of which is extended closer to the cover plate 37 than the upper base plate 36 to be a locked portion 58d.

Next, with reference to FIGS. 14 and 15, a mounting configuration of a pressing member 64 to the holding member 57 will be described. The holding member 57 has the shaft 57a and a shaft 57b standing thereon, and a stopper 57c at the tip. The pressing member 64 rotatably mounted to the shaft 57b has two pressing pieces 64a and 64b, and an abutment portion 64c bent toward an operation surface of the holding member 57.

Then, the two pressing pieces 64a and 64b provided on the pressing member 64 press the pressed portions 53d and 54d of the iron scrap members 53 and 54 mounted to the front blade releasing member 51 and the rear blade releasing member 52, and press the iron scrap members 53 and 54 against the iron core members 47a and 48a of the electromagnets 47 and 48. The stopper 57c and the abutment portion 64c prevent rotation of the pressing member 64 with respect to the holding member 57, and when the pressing member 64 is rotated counterclockwise from the state in FIG. 14, the abutment portion 64c abuts the stopper 57c and is stopped, and when the pressing member 64 is rotated clockwise, the abutment portion 64c abuts an end surface of the holding member 57 and is stopped.

As shown in FIG. 14, a shaft 36i stands on the upper base plate 36, to which a release member 65 is rotatably mounted. The release member 65 is placed closer to the cover plate 37 than the front blade releasing member 51 and the holding member 57, and elastically biased to be rotated counterclockwise by an unshown spring, and in the state in FIG. 14, the rotation is prevented by an unshown stopper. The release member 65 has a locking portion 65a for locking the locked portion 58d of the holding auxiliary member 58, and an operating portion 65b bent and protruding to the right of the upper base plate 36. The cover plate 37 is mounted to the shafts 36a and 36b as described above, and has two holes without reference numerals fitted on a small diameter portion at a tip of the shaft 36i and a tip of the shaft 36h, and an elongated stopper 37b bent toward the upper base plate 36 on the right in FIG. 14.

Next, configurations of the front blade and the rear blade placed in the blade chambers will be described with reference to FIG. 13. First, the front blade is constituted by two arms 66 and 67 pivoted on two shafts 31g and 31k standing on the shutter base plate 31 in the blade chamber, and three blades 68, 69 and 70 pivoted in the order toward the tips, and the blade 70 is a slit forming blade. The driving pin 41c of the front blade driving member 41 is fitted in a known hole formed in the arm 66. On the other hand, the rear blade is placed in such a manner that the front blade is turned upside down, and is constituted by two arms 71 and 72 pivoted on two shafts 31h and 31m standing on the shutter base plate 31 in the blade chamber, and three blades 73, 74 and 75 pivoted in the order toward the tips, and the blade 75 is a slit forming blade. The driving pin 42c of the rear blade driving member 42 is fitted in a known hole formed in the arm 71. In the embodiment, the front blade and the rear blade each have three blades, but may each have one blade, or the front blade and the rear blade may have blades of different numbers.

Next, the operation of the embodiment will be described. FIGS. 13 and 14 show a set state of the embodiment. At this time, the setting member 43 is rotated clockwise by a biasing force of an unshown spring, and the roller 44b is pressed to rotate the set operation member 44 counterclockwise as described above, and the set operation member 44 abuts the bent portion 38a of the shelf plate 38, thereby maintaining this state. For the setting member 43 and the set operation member 44, the positions in this state are initial positions. In the set state, the rollers 43b and 43c of the setting member 43 are placed outside operation ranges of the rollers 41b and 42b of the front blade driving member 41 and the rear blade driving member 42.

In the set state, the locked portion 41a of the front blade driving member 41 is locked by the locking portion 45a of the front blade locking member 45 against elasticity of an unshown front blade driving spring, and the locked portion 42a of the rear blade driving member 42 is locked by the locking portion 46a of the rear blade locking member 46 against elasticity of an unshown rear blade driving spring. Thus, the front blade connected to the driving pin 41c of the front blade driving member 41 maintains a state where the three blades 68, 69 and 70 are spread to cover the aperture 31a, and the rear blade connected to the driving pin 42c of the rear blade driving member 42 maintains a state where the three blades 73, 74 and 75 are stacked and stored below the aperture 31a.

Further, at this time, as shown in FIG. 14, the locked portion 58d of the holding auxiliary member 58 is locked by the locking portion 65a of the release member 65. Thus, as shown in FIG. 15, the separating spring 63 is in tension loosely fitted to the tubular shaft member 59 and having one end placed on the upper base plate 36 and the other end placed on the bent portion 58c of the holding auxiliary member 58. At this time, the pressing pieces 64a and 64b of the pressing member 64 mounted to the holding member 57 press the pressed portion 53d of the iron scrap member 53 mounted to the front blade releasing member 51 and the pressed portion 54d of the iron scrap member 54 mounted to the rear blade releasing member 52 to press the iron scrap members 53 and 54 against the iron core members 47a and 48a of the electromagnets 47 and 48. In this state, the abutment portion 58a of the holding auxiliary member 58 is placed away from the shaft 57a of the holding member 57. Thus, the connecting spring 62 is also in tension fitted to both the tubular shaft member 59 and the cylindrical member 60 and having one end placed on the shaft 57a of the holding member 57 and the other end placed on the bent portion 58b of the holding auxiliary member 58.

When a release button of a camera is pressed in such a set state, the front blade first starts an opening operation of the aperture 31a, and the rear blade starts a closing operation of the aperture 31a after a predetermined time. In normal daylight photography, the slit forming blade 70 of the front blade and the slit forming blade 75 of the rear blade form a slit, and photosensitive surfaces of a film or imaging surfaces of a solid-state image pickup device are continuously exposed. For convenience of description, the case where the front blade fully opens the aperture 31a and then the rear blade starts closing the aperture 31a will be hereinafter described.

In the set state, when the release button of the camera is pressed, current is first supplied to the coils 47b and 48b of the two electromagnets 47 and 48 in FIG. 14. Thus, the iron scrap member 53 mounted to the front blade releasing member 51 and the iron scrap member 54 mounted to the rear blade releasing member 52 are sucked and held by the iron core members 47a and 48a of the electromagnets 47 and 48. Then, when a member of a camera body presses the operating portion 65b of the release member 65 downward, the release member 65 is rotated clockwise against a biasing force of an unshown spring to release a lock of the locked portion 58d by the locking portion 65a. Thus, the holding auxiliary member 58 is rotated counterclockwise by a biasing force of the connecting spring 62 extending between the holding auxiliary member 58 and the holding member 57 and the elasticity of the separating spring 63 extending between the holding auxiliary member 58 and the upper base plate 36.

When the abutment portion 58a of the holding auxiliary lever 58 abuts the shaft 57a of the holding member 57, torque by the connecting spring 62 is lost, and then both the holding member 57 and the holding auxiliary member 58 are rotated counterclockwise by only the biasing force of the separating spring 63, and the pressing pieces 64a and 64b of the pressing member 64 mounted to the holding member 57 are moved away from the pressed portions 53d and 54d of the iron scrap members 53 and 54. FIG. 16 shows a state where the pressing member 64 then abuts the stopper portion 37b of the cover plate 37 to stop the holding member 57.

Then, when the coil 47b of the front blade electromagnet 47 is deenergized by a signal from an exposure control circuit, the front blade releasing member 51 is rotated counterclockwise by elasticity of an unshown spring, and the pressing portion 51a presses the pressed portion 45b of the front blade locking member 45 to rotate the front blade locking member 45 clockwise against elasticity of an unshown spring. Thus, the locking portion 45a of the front blade locking member 45 releases the lock of the locked portion 41a of the front blade driving member 41. At this time, a pressing force of the member of the camera body to the operating portion 65b of the release member 65 is released, and the release member 65 is rotated counterclockwise by elasticity of an unshown spring, and the locking portion 65a abuts the locked portion 58d of the holding auxiliary member 58. This state is as shown in FIG. 17.

In this manner, when the lock by the front blade locking member 45 is released, the front blade driving member 41 is rapidly rotated counterclockwise from the state in FIG. 13 by elasticity of an unshown front blade driving spring. Thus, the three blades 68, 69 and 70 of the front blade are moved above the aperture 31a with an increasing amount of mutual overlapping of adjacent blades to open the aperture 31a from below. When the aperture 31a is fully opened, immediately thereafter, the driving pin 41c of the front blade driving member 41 abuts the shock absorbing member 34 mounted to the upper end of the slot 31b and is stopped, and the three blades 68, 69 and 70 of the front blade are stacked and stored above the aperture 31a. FIG. 18 shows this state.

When the front blade fully opens the aperture 31a, then the coil 48b of the electromagnet 48 of the rear blade is deenergized. Thus, the rear blade releasing member 52 is rotated clockwise by elasticity of an unshown spring, and the pressing portion 52a presses the pressed portion 46b of the rear blade locking member 46.

Thus, the rear blade locking member 46 is rotated clockwise against elasticity of an unshown spring, and the locking portion 46a releases the lock of the locked portion 42a of the rear blade driving member 42. This state is as shown in FIG. 19.

Thus, when the lock by the rear blade locking member 46 is released, the rear blade driving member 42 is rapidly rotated counterclockwise from the state in FIG. 18 by elasticity of an unshown rear blade driving spring. Thus, the three blades 73, 74 and 75 of the rear blade are moved into the aperture 31a with a decreasing amount of mutual overlapping of adjacent blades to close the aperture 31a from below. When the aperture 31a is fully closed, immediately thereafter, the driving pin 42c of the rear blade driving member 42 abuts the shock absorbing member 35 mounted to the upper end of the slot 31c and is stopped. FIG. 20 shows a state where the exposure operation by the front blade and the rear blade is finished, and the three blades 73, 74 and 75 of the rear blade are spread to close the aperture 31a.

When the photography is finished, the setting operation is then performed. In this case, in the embodiment, the roller 44a of the set operation member 44 is first pressed by the unshown member of the camera body and rotated clockwise. Thus, the set operation member 44 rotates the holding auxiliary member 58 clockwise in FIG. 19 with the roller 44c, while rotates the setting member 43 counterclockwise in FIG. 20 with the roller 44b. The rotations of the holding auxiliary member 58 and the setting member 43 are performed substantially concurrently, but the holding auxiliary member 58 will be first described for convenience of description.

First, as described above, when the holding auxiliary member 58 is pressed by the roller 44c of the set operation member 44 to start clockwise rotation in FIG. 19, the biasing force of the connecting spring 62 is larger than the biasing force of the separating spring 63 at this time, and the holding member 57 starts clockwise rotation against elasticity of the separating spring 63 together with the holding auxiliary member 58 with the shaft 57a in contact with the abutment portion 58a of the holding auxiliary member 58.

During the clockwise rotation, the locked portion 58d of the holding auxiliary member 58 is brought into slide contact with a left end surface of the locking portion 65a of the release member 65, but the holding member 57 presses the pressed portions 53d and 54d of the iron scrap members 53 and 54 mounted to the front blade releasing member 51 and the rear blade releasing member 52 with the pressing members 64, rotates the front blade releasing member 51 clockwise against elasticity of an unshown spring, and rotates the rear blade releasing member 52 counterclockwise against elasticity of an unshown spring. Along therewith, the pressing forces of the pressing portions 51a and 52a of the releasing members 51 and 52 are released, and the front blade locking member 45 and the rear blade locking member 46 are rotated counterclockwise by elasticity of unshown springs. FIG. 21 shows a state where the iron scrap members 53 and 54 mounted to the front blade releasing member 51 and the rear blade releasing member 52 are brought into contact with the iron core members 47a and 48a of the electromagnets 47 and 48 in normal positions.

When the iron scrap members 53 and 54 are brought into contact with the iron core members 47a and 48a as described above, the sucked surfaces of the iron scrap member 53, 54 are not entirely brought into contact with the sucking surfaces of the iron core members 47a and 48a from the beginning.

The sucked surfaces of the iron scrap members 53 and 54 are first tilted with respect to the sucking surfaces of the iron core members 47a and 48a, and only part of the sucked surfaces are brought into contact with part of the sucking surfaces of the iron core members 47a and 48a. Then, the sucked surfaces gradually become parallel and are finally entirely brought into contact the sucking surfaces. The iron scrap members 53 and 54 of the embodiment are mounted to the bent portions 51b and 52b of the releasing members 51 and 52 so that such an operation can be suitably performed. This will be described in detail with reference to FIGS. 25 and 26 showing a mounting configuration of the iron scrap member 53.

FIG. 25 shows a state where the shaft 53a is tilted so that the flange 53c swings along the sheet surface of FIG. 21 when the iron scrap member 53 enters the state in FIG. 21, FIG. 25A shows a state where the shaft 53a is tilted counterclockwise by an angle 05, and FIG. 25B shows a state where the shaft 53a is tilted clockwise by an angle 06. In these cases, the shaft 53a is moved longitudinally in the hole 55a of the collar member 55, and thus the flange 53c is smoothly displaced along the arcuate surface formed on the arcuate portion 55b of the collar member 55.

FIG. 26 shows a state where the shaft 53a is tilted so that the flange 53c swings perpendicularly to the sheet surface of FIG. 21 when the iron scrap member 53 enters the state in FIG. 21, FIG. 26A shows a state where the shaft 53a is tilted counterclockwise by an angle 07, and FIG. 26B shows a state where the shaft 53a is tilted clockwise by an angle 08. In these cases, the shaft 53a presses and moves the edge in a widthwise direction of the hole 55a of the collar member 55a, and thus the flange 53c is smoothly displaced together with the collar member 55 along the arcuate surface 51b-2 formed on the bent portion 51 of the front blade releasing member 51.

The collar members 55 and 56 of the embodiment are made of metal and have the same shape as the collar member 7 in FIG. 4, but may be made of synthetic resin like the collar member 7' in FIG. 10. As shown in FIG. 26, in the embodiment, the collar member 55 is brought into contact with the arcuate surface 51b-2 formed on the bent portion 51b of the front blade releasing member 51. Instead of forming the arcuate surface 51b-2 on the bent portion 51b, two protrusions may be provided in positions corresponding to the top of the arcuate surface 51b-2 with the hole 51b-1 therebetween so that the collar member 55 is brought into contact with the protrusions, thereby obtaining the same advantages. FIG. 27 shows a variation having such a configuration, FIG. 27A is a plan view thereof and FIG. 27B is a sectional view from below in FIG. 27A. As is apparent from FIG. 27A, in this variation, two protrusions 51b-4 and 51b-5 are formed with a hole 51b-1 therebetween in a recess of a bent portion 51b. Thus, also in the variation, a shaft 53a can be smoothly tilted along the sheet surface of FIG. 27B.

Thus, in the state in FIG. 21, the contact between the pressing portions 51a and 52a of the two releasing members 51 and 52 and the pressed portions 45b and 46b of the two locking members 45 are 46 is released, and the rotations of the two locking members 45 and 46 are stopped by the pressed portions 45b and 46b abutting the left edges of the holes 36c and 36d of the upper base plate 36. When the holding auxiliary member 58 is further rotated clockwise from the state in FIG. 21, the holding member 57 cannot be further rotated because the iron scrap members 53 and 54 are brought into contact with the iron core members 47a and 48a as described above, and the abutment portion 58a of the holding auxiliary member 58 is moved away from the shaft 57a of the holding member 57, and thereafter the connecting spring 62 as well as the separating spring 63 are in tension.

Immediately thereafter, the slide contact between the locked portion 58d of the holding auxiliary member 58 and the locking portion 65a of the release member 65 is released, and the release member 65 is slightly rotated counterclockwise by elasticity of an unshown spring, and abuts an unshown stopper, thereby allowing the holding auxiliary member 58 to be locked. The moment of allowing the lock is shown in FIG. 22. Actually, the holding auxiliary member 58 is further rotated, and the locking portion 65a of the release member 65 locks the locked portion 58d of the holding auxiliary member 58 when the set operation member 44 finishes the setting operation and returns counterclockwise as described later.

On the other hand, when the set operation member 44 is rotated clockwise by the member of the camera body from the state in FIG. 20, the roller 44b of the set operation member 44 presses the pressed portion 43a of the setting member 43, and rotates the setting member 43 counterclockwise against elasticity of an unshown spring.

Thus, the rollers 43b and 43c of the setting member 43 successively press the rollers 41b and 42b of the front blade driving member 41 and the rear blade driving member 42, and rotate the driving members 41 and 42 clockwise against elasticity of unshown driving springs.

Then, first, when the front blade driving member 41 starts clockwise rotation, the three blades 68, 69 and 70 of the front blade stored above the aperture 31a are moved downward with a decreasing amount of mutual overlapping of the adjacent blades. Then, when the amount of mutual overlapping of the slit forming blade 70 of the front blade and the slit forming blade 75 of the rear blade reaches a predetermined amount, the rear blade driving member 42 also starts clockwise rotation. Thus, the three blades 73, 74 and 75 of the rear blade are moved downward with a decreasing amount of mutual overlapping of the adjacent blades from that time. Thereafter, the front blade and the rear blade continue moving with a suitable amount of mutual overlapping of the slit forming blades maintained.

In this manner, the setting operation is performed, the three blades 68, 69 and 70 of the front blade are spread to cover the aperture 31a, and the three blades 73, 74 and 75 of the rear blade are stacked to reach below the aperture 31a. Then, the locked portion 41a of the front blade driving member 41 is brought into contact with the locking portion 45a of the front blade locking member 45 to slightly rotate the front blade locking member 45 clockwise against elasticity of an unshown spring. Then, the front blade driving member 41 continues rotating to release the contact, and then the front blade locking member 45 is rotated counterclockwise by elasticity of the unshown spring, allowing the locked portion 41a to be locked by the locking portion 45a. FIG. 23 shows this state.

Further, immediately before entering the state in FIG. 23, the locked portion 42a of the rear blade driving member 42 is also brought into contact with the locking portion 46a of the rear blade locking member 46, and when entering the state in FIG. 23, the rear blade locking member 46 is slightly rotated clockwise against elasticity of an unshown spring. Thus, the rear blade driving member 42 is further rotated clockwise from this state, the contact between the locked portion 42a and the locking portion 46a is released, and the rear blade locking member 46 is rotated counterclockwise by elasticity of an unshown spring, allowing the locked portion 42a to be locked by the locking portion 46a. FIG. 24 shows this state.

Clockwise torque of the set operation member 44 by the unshown member of the camera body is lost immediately after the set operation member 44 enters the state in FIG. 24.

Thus, the setting member 43 is rotated clockwise by elasticity of the unshown spring, and the pressed portion 43a presses the roller 44b of the set operation member 44 and rotates the set operation member 44 counterclockwise. Then, the rear blade driving member 42 follows by elasticity of the unshown rear blade driving spring, and when the locked portion 42a is locked by the locking portion 46a of the rear blade locking member 46, the roller 43c of the setting member 43 is moved away from the roller 42b of the rear blade driving member 42, then the front blade driving member 41 follows by elasticity of the unshown front blade driving spring, and when the locked portion 41a is locked by the locking portion 45a of the front blade locking member 45, the roller 43b of the setting member 43 is also moved away from the roller 41b of the front blade driving member 41.

On the other hand, when the set operation member 44 is rotated counterclockwise, the roller 44c releases a pressing force of the holding auxiliary member 58. Thus, the holding auxiliary member 58 follows by elasticity of the connecting spring 62 and elasticity of the separating spring 63, and the locked portion 58d is locked by the locking portion 65a of the release member 65. However, in the locked state, the abutment portion 58a of the holding auxiliary member 58 has not yet been brought into contact with the shaft 57a of the holding member 57. Then, the setting member 43 still rotates the set operation member 44 counterclockwise, and stops when the set operation member 44 abuts the bent portion 38a of the shelf plate 38. FIGS. 13 and 14 show a state where the setting operation is completed, and this state is a standby state of the next photography.

Thus, this embodiment applies the present invention to the locking type focal plane shutter having the configurations described in Japanese Utility Model Publication Nos. 6-24825 and 4-3301, but the present invention may be applied to the locking type focal plane shutter having a configuration described in Japanese Utility Model Publication No. 7-3392.

The embodiment of the invention is configured as a focal plane shutter including two shutter blades (a front blade and a rear blade) that can be adopted in silver film cameras and digital cameras. However, among the components of the embodiment, the front blade constituted by the arms 66 and 67 and the blades 68, 69 and 70, the front blade driving member 41, the front blade locking member 45, the front blade releasing member 51, and the front blade electromagnet 47 can be removed to configure a focal plane shutter including one shutter blade that can be adopted to only digital cameras.

What is claimed is:

1. A focal plane shutter, comprising:
one or two shutter blade assemblies comprising two arms and at least one blade pivoted on the arms;
one or two electromagnet assemblies comprising an iron core member and a coil;
one or two driving means including a mounting member mounted with an iron scrap member, for bringing said iron scrap member into proximity with said iron core member, causing said iron scrap member to be attracted and held by said iron core member when said coil is energized during photographing, and separating said iron scrap member from said iron core member to operate said shutter blade with a driving spring when said coil is deenergized; and
a setting member that is operable from an initial position to operate said driving means to a set position against a biasing force of said driving spring in setting, and returns to the initial position before said shutter blade is operated,
wherein said iron scrap member includes a shaft fitted in a mounting hole of said mounting member, an iron scrap portion is provided at one end of said shaft and brought into contact with said iron core member, and a removal preventing flange is provided at the other end of said shaft, a collar member is loosely fitted to said shaft between said mounting hole and said flange, an edge of said mounting hole is formed to have an arcuate surface protruding toward said collar member, and said collar member is formed to have, on the flange side, an arcuate surface protruding toward the flange and substantially perpendicular to said arcuate surface whereby tilt starting operation of the shaft can be smoothly performed,
wherein said driving means includes a driving member connected to said shutter blade and rotated by elasticity of said driving spring, a locking member that locks said driving member in a set position, said mounting member that releases the lock of said driving member by said locking member when said coil is deenergized, and a holding member that presses said mounting member to bring said iron scrap member into contact with said iron core member in setting and releases after said coil is energized.

2. A focal plane shutter comprising:
one or two shutter blade assemblies comprising two arms and at least one blade pivoted on the arms;
one or two electromagnet assemblies comprising an iron core member and a coil;
one or two driving means including a mounting member mounted with an iron scrap member, for bringing said iron scrap member into proximity with said iron core member, causing said iron scrap member to be attracted and held by said iron core member by said coil in photography, and separating said iron scrap member from said iron core member to operate said shutter blade with a driving spring when said coil is deenergized; and a setting member that is operated from an initial position to operate said driving means to a set position against an biasing force of said driving spring in setting, and returns to the initial position before said shutter blade is operated,
wherein said iron scrap member includes a shaft fitted in a mounting hole of said mounting member, an iron scrap portion provided at one end of said shaft and brought into contact with said iron core member, and a removal preventing flange provided at the other end of said shaft, a collar member is loosely fitted to said shaft between said mounting hole and said flange, an edge of said mounting hole is formed to have an arcuate surface protruding toward said collar member, and said collar member is formed to have, on the flange side, an arcuate surface protruding toward the flange and substantially perpendicular to said arcuate surface wherein tilt starting operation of the shaft can be smoothly performed,
wherein said driving means includes a driving member connected to said shutter blade and rotated by elasticity of said driving spring, a locking member that locks said driving member in a set position, and said mounting member that is operated together with said driving member to said set position by said setting member in setting, and releases the lock of said driving member by said locking member when said coil is deenergized after said setting member returns to the initial position.

* * * * *